United States Patent [19]

Fukushima et al.

[11] Patent Number: 5,656,709

[45] Date of Patent: *Aug. 12, 1997

[54] HYBRID MATERIAL AND PROCESS FOR PRODUCING THE SAME

[75] Inventors: Yoshiaki Fukushima; Masaaki Tani, both of Aichi, Japan

[73] Assignee: Kabushiki Kaisha Toyota Chuo Kenkyusho, Aichi-ken, Japan

[*] Notice: The portion of the term of this patent subsequent to Apr. 12, 2015, has been disclaimed.

[21] Appl. No.: 449,720

[22] Filed: May 24, 1995

[30] Foreign Application Priority Data

May 24, 1994 [JP] Japan .................................... 6-135172

[51] Int. Cl.$^6$ ................................................ C08G 78/00
[52] U.S. Cl. ................................. 528/9; 528/395; 525/360
[58] Field of Search ........................ 528/9, 385; 525/360

[56] References Cited

U.S. PATENT DOCUMENTS 4,298,723  11/1981  DiGiacomo et al. .
5,527,871   6/1996  Tani et al. ..................................... 528/10

Primary Examiner—Edward J. Cain
Attorney, Agent, or Firm—Oblon, Spivak, McClelland, Maier & Neustadt, P.C.

[57] ABSTRACT

A hybrid material includes a layer containing an octahedral sheet comprising octahedra linked with each other to provide a sheet-like structure and a tetrahedral sheet comprising tetrahedra linked with each other to provide a sheet-like structure; and an organic portion bonded by covalent bond to an element located at the tetrahedral site of the tetrahedra constituting the layer; each of the octahedra having an element at the octahedral site thereof with a valence in the range of from 3.5 to 4.5 on average over the entire octahedral sheet, and each of the tetrahedra having an element at the tetrahedral site thereof with a valence in the range of from 4.5 to 5.5 on average over the entire tetrahedral sheet. A process for fabricating the hybrid material and a process for controlling the content of the organic and inorganic components of the hybrid material are also provided. Any type of organic component is allowed to be incorporated in the hybrid material.

17 Claims, 15 Drawing Sheets

HYBRID MATERIAL AND PROCESS FOR PRODUCING THE SAME

BACKGROUND OF THE INVENTION

1. Field of the Invention

The present invention relates to a hybrid material comprising an organic and an inorganic component, which is suitable for use in a special member requiring superior properties concerning heat-resistance, rigidity, resistance against solvents, and the like. The present invention also relates to a process for producing the same, and to a method for controlling the quantity of the inorganic and the organic components in the hybrid material.

2. Description of the Related Art

Hybrid materials comprising an inorganic component such as a clay mineral in combination with an organic component such as polyamide have been heretofore proposed. Hybrid materials of this type are of high practical value, because they exhibit both of the characteristics inherent in the inorganic and the organic components.

More specifically, a hybrid material comprising a layered inorganic material such as layered clay mineral and an organic material is used as a catalyst for polymerization, etc. (reference can be made to, for example, JP-A-Sho51-109998, JP-A-Sho62-72723, JP-A-Sho62-64827, JP-A-Hei5-306370, and JP-A-Hei5-32406; the term "JP-A-" as referred herein signifies "an unexamined published Japanese patent application"). In the methods proposed in the foregoing JP-A-Sho51-109998, JP-A-Sho62-72723, and JP-A-Sho62-64827, a layered clay mineral is subjected to ion-exchange treatment to obtain a layered clay mineral rendered organic by replacing the interlayer cation with an ion of an amino acid, etc. The ion-exchanged layered clay mineral thus obtained is used thereafter as a starting material for producing, for example, a polymerization catalyst, a composite, etc. The methods disclosed in JP-A-Hei5-306370 and JP-A-Hei5-32406 provide a polymerization catalyst, a composite, etc., in a manner similar to that disclosed above, except for using a zirconium phosphate type layered substance in the place of the aforementioned layered clay mineral.

For instance, JP-A-Hei5-306370 proposes a process for producing a hybrid material comprising an organic material and an inorganic material as follows.

An α- or a γ-zirconium phosphate is dispersed and suspended in water, and after adding 12-aminododecanoic acid therein, the resulting suspension is stirred for a duration of from 2 to 6 hours. The resulting suspension is allowed to stand still at room temperature for a duration of several days, and a zirconium phosphate 12-aminododecanoic acid derivative is obtained by filtration, rinsing, and drying the suspension thereafter. The product thus obtained is mixed with ε-caprolactam and aminohexanoic acid, and is charged into a glass polymerization tube. After purging the gas inside the reaction tube with nitrogen, polymerization was effected by maintaining the tube at 100° C. for a duration of 90 minutes, then at 250° C. for 2 hours under atmospheric pressure, and finally at 250° C. for 5 hours under reduced pressure. A hybrid material of zirconium phosphate and polyamide is obtained in this manner.

However, a hybrid material of an organic material and an inorganic material obtained heretofore still have problems yet to be solved. In a layered clay mineral with exchanged organic cations or a layered zirconium phosphate with an exchanged organic derivative, the layered inorganic material is bonded to an organic molecule by ionic bond. However, a substance formed by ionic bond readily undergoes an ion exchange reaction with an externally supplied ion. Accordingly, a readily exchangeable substance such as an amino acid, a diamine, and a dicarboxylic acid has been excluded from the organic constituent of the hybrid material. More specifically, for example, if an organic compound such as 6-amino-caproic acid, etc., which is capable of producing 6-nylon similar to ε-caprolactam is used, 6-amino-caproic acid and the like may be readily substituted for the previously bonded cation. In such a case, the material cannot be obtained as designed. Considering a case of a nylon produced by condensation of a diamine (NH—R—NH) with a dicarboxylic acid (COOH—R—COOH), e.g., 6,6-nylon, diamine is substituted for the previously bonded cation during the synthesis. This sometimes hinders the progress of interlayer polymerization of nylon completely, or sometimes allows the reaction progress only partly to generate a function of nylon in the interlayer. Thus, the composite thus obtained may result with little improvement in mechanical characteristics concerning elastic modulus, strength, elongation, etc., or in barrier function against gas permeation. Moreover, the resulting composite may suffer embrittlement.

Thus, it is difficult to obtain a hybrid material with the desired effect in case a polymer which uses an ionic substance during the synthesis thereof is employed. Undesirable polymers include 4,6-nylon, 6,6-nylon, 6,10-nylon, and 6,12-nylon, in which a synthesized nylon salt is subjected to polycondensation reaction, because ions previously introduced to a layered inorganic material by ion exchanging can be easily exchanged by an externally provided ion. Polyolefins such as polypropylene are also unsuitable, because metallic salts and the like are used for the polymerization catalyst. In this case, ion exchange proceeds during mixing or heating for polymerization. This hinders the formation of a composite material comprising separate and dispersed unit layers (layered structure).

Furthermore, in case of synthesizing a compound having a catalytic function by adding another inorganic ion, etc., to a layered inorganic material already rendered organic, the desired compound cannot be synthesized from a hybrid material having an ionic bond because of the ion exchange reaction. Exchange adsorption of an element or a molecule occurs depending on the difference of ionization tendency. Thus, when two types or more of organic ions were to be dispersed in the interlayer of an inorganic material, selective adsorption occurs to a certain type of ion. It can be understood therefrom that it is impossible to control the quantity of the organic ions bonded to the polymer or the quantity ratio of the organic and the inorganic materials bonded to the layer.

In case of rendering a layered inorganic material organic by an ion exchange treatment, a relatively large molecule must be intercalated between the layers by forcing it against the bonding force of the layers. If the layered inorganic material is a clay mineral, water can be used to facilitate the intercalation by expanding therewith the spacing between the layers. The same mechanism is believed to work on other types of layered substances. However, because layered inorganic materials have interlayer hydrogen bonds at a higher density than a clay mineral has, it is assumed rather difficult for the layered inorganic materials to incorporate a water molecule between the layers. Thus, in general, a reaction for a long duration of time is required in case of introducing organic ions to a layered inorganic material completely.

Furthermore, even if the reaction for rendering the inorganic material organic should proceed to such an extent as to attain an average basal spacing in a range of from 15 to 30 Å, even a few bondings between layers may prevent the material from swelling by intercalating polymer. In such a case, the expected effects cannot be obtained.

To obtain a material having a novel function by controlling the alignment of the organic molecules therein, or to intensify the function as a barrier for gas permeation by dispersing large lamella crystals, the layered inorganic material must be previously developed into coarse and perfect crystals by crystal growth. Concerning a case of growing crystals of a clay mineral, for instance, a smectite group mineral readily forms an intercalated compound, but it changes into a large vermiculite crystal which takes a long time for intercalation, and then to a mica mineral which rarely takes up other interlayer cations. In case of other layered inorganic compounds such as zirconium phosphate, it is difficult to render the compounds organic because the compound tends to adsorb less organic ions as the crystals grow large. Moreover, it becomes more difficult to polymerize the organic ions with increasing the size of crystals. Accordingly, so long as the inorganic substance is rendered organic based on ion adsorption, it is found difficult to control the size and the perfection of a crystal.

On the other hand, the dispersibility in the later step of polymerization can be increased by reducing the size of the crystals. However, there is a limit in controlling the crystal size. That is, in case of a naturally occurring mineral such as a clay mineral, the size and the like of the crystals depend on the raw material. It is difficult to obtain crystals with a smaller or specific size, if any, among naturally occurring minerals. In case of synthesizing artificially a clay mineral or other types of layered inorganic materials, it is necessary to perform some crystallization by hydrothermal reaction or by gelation at room temperature followed by a treatment such as heating or hydrothermal reaction. Further crystallization treatment is necessary after simple gelation at room temperature is performed, because most of the products are obtained at amorphous states by the gelation. The desired material cannot be obtained unless crystallization reaction is effected to a certain extent.

Referring to a schematically drawn structure given in FIG. 2, a layered clay mineral in general comprises an octahedral sheet consisting of a plurality of octahedra bonded with each other and each containing aluminum or magnesium in the octahedral site, being 6-fold coordinated with oxygen or hydroxyl groups. A tetrahedral sheet consisting of $SiO_4$ tetrahedra is bonded by plane to plane with the octahedral sheet to provide a layered structure. In case of bonding an organic portion directly with the inorganic structural unit above, an —O—Si—C—R (where R represents an organic portion) bond must be incorporated by once cutting the Si—O—Si bond of the tetrahedral sheet. Although this is not impossible, lattice defects must be inevitably introduced into the crystals.

Referring to the schematically drawn zirconium phosphate structure in FIG. 3, reversely to the case of a clay mineral, the apices of the tetrahedral sheet are pointed in the direction opposite to the octahedral sheet. Exchangeable cations such as $H^+$ are bonded to the apical oxygen. In a common zirconium phosphate, organic cations are bonded by ionic bonds at the cationic sites. In such a structure, an —Si—C—R bond as illustrated in FIG. 1 can be introduced by substituting carbon for the apical oxygen located at the outer side of the tetrahedral sheet without inducing any defects in the crystal structure.

Organic derivatives of zirconium phosphates containing organic portion (R) directly bonded to an inorganic layer of this type are described in, for example, G. Alberti and U. Costautino, in Chap. 5 of *Intercalation Chemistry* (Edited by M. S. Whittingham and A. J. Jacobson), Academic Press (1982). However, no information is available on the synthetic process for obtaining a composite of the substance and the polymer, the characteristics of a composite, and the means for realizing the effect of the composite as a polymerization catalyst.

As described in the foregoing, hybrid materials having been proposed in the prior arts comprise an organic material and an inorganic material bonded with each other by an ionic bond. Accordingly, only limited types of organic materials are usable for the composite. In particular, industrially useful 6,6-nylon and polyolefins cannot be used in a hybrid material. Furthermore, because large layered inorganic materials are not available, the control of gas permeability and the like is still limited in case of using the hybrid materials known to the present.

In U.S. Pat. No. 4,298,723 is proposed a hybrid material comprising an organic compound bonded by covalent bond with an inorganic compound. The hybrid material disclosed therein comprises a layered structure comprising an octahedral sheet consisting of octahedra bonded with each other in a sheet-like manner and a tetrahedral sheet consisting of tetrahedra bonded with each other in a sheet-like structure, and an organic compound bonded to the layered structure. The octahedra comprises oxygen arranged in a 6-fold coordination with respect to a tetravalent element such as zirconium in the octahedral site, and the tetrahedra comprises oxygen arranged in a 4-fold coordination with respect to a pentavalent element such as phosphorus located at the tetrahedral site. The organic compound is bonded by covalent bond to the tetrahedral metal of the layered structure.

The only organic compound which is included in the hybrid material of the aforementioned prior art is an acrylic acid. The composite is used specifically as an adsorbent to adsorb particular components from a medium, an additive (filler) for a polymer composition, or a solid lubricant, etc. However, the superior characteristics inherent in an organic material, such as high tensile strength, are not still expected because the composite has a basal spacing as short as 4.2 nm or even less. Furthermore, the composite has poor formability.

SUMMARY OF THE INVENTION

An object of the present invention is to provide a hybrid material comprising an organic component and an inorganic component, in which any type of organic component is allowed to be incorporated without any restriction. Another object of the present invention is to provide a process for fabricating the same, and a process for controlling the mechanical properties and the like of the composite by controlling the content of the organic and the inorganic components of the hybrid material.

According to a first aspect of the present invention, there is provided a hybrid material comprising:

a layer containing an octahedral sheet comprising octahedra linked with each other to provide a sheet-like structure and a tetrahedral sheet comprising tetrahedra linked with each other to provide a sheet-like structure, said tetrahedral sheet being linked to said octahedral sheet by plane to plane; and a first organic portion bonded by covalent bond to an element located at the tetrahedral site of the tetrahedra, each of said octahedra having an element at the octahedral site thereof with a valence in the range of from 3.5 to 4.5 on average over the entire octahedral sheet, and each of said tetrahedra having an element at the tetrahedral site thereof with a valence in the range of from 4.5 to 5.5 on average over the entire tetrahedral sheet, wherein the layer is a zirconium phosphate-type layer expressed by $Me[XO_3.R]_2$, where Me represents at least one element selected from the group consisting of titanium, zirconium, germanium, tin, lead, and cerium; X represents at least one selected from the group consisting of phosphorus and arsenic; and R represents said first organic portion, said X being bonded by covalent bond to said R.

In the present invention, "an element at the tetrahedral (or octahedral) site" is sometimes referred to simply hereinafter as "the tetrahedral (octahedral) element". All these elements mean an element located at the body center of the tetrahedral (octahedral) unit.

The "layer" as referred to in the present invention signifies a laminate (layered structure) comprising an octahedral sheet and a tetrahedral sheet, as exemplified in FIG. 1.

According to a second aspect of the present invention, there is provided a process for producing a hybrid material comprising the step of:

reacting a substance containing: an element which functions as an element at the octahedral site of octahedra constituting an octahedral sheet; and other elements constituting the octahedral sheet except for the element at the octahedral site, with a substance containing: an element at the tetrahedral site of tetrahedra constituting a tetrahedral sheet; a first organic portion that is combined by covalent bond with the element at the tetrahedral site; and other elements constituting the tetrahedral sheet except for the element at the tetrahedral site, in such a manner that the resulting octahedral sheet has elements at the octahedral sites thereof with an average valence in the range of from 3.5 to 4.5 and that the resulting tetrahedral sheet has elements at the tetrahedral sites thereof with an average valence in the range of from 4.5 to 5.5, thereby obtaining a hybrid material having a layer containing the octahedral sheet comprising octahedra linked with each other to provide a sheet-like structure and the tetrahedral sheet comprising tetrahedra linked with each other to provide a sheet-like structure, said tetrahedral sheet being linked to said octahedral sheet by plane to plane, and a first organic portion bonded by covalent bond to the element located at the tetrahedral site of the tetrahedra.

The reaction step is performed by reacting a substance containing: at least one element selected from the group consisting of titanium, zirconium, germanium, tin, lead, and cerium; and oxygen, with a substance containing: at least one element selected from the group consisting of phosphorus and arsenic; the first organic portion bonded thereto; and oxygen, to obtain a zirconium phosphate-type layer expressed by $Me[XO_3.R]_2$ for said layer, where Me represents at least one element selected from the group consisting of titanium, zirconium, germanium, tin, lead, and cerium; X represents at least one selected from the group consisting of phosphorus and arsenic; and R represents the first organic portion, said X being bonded by covalent bond to said R.

According to a third aspect of the present invention, the process further comprises the step of controlling the content of an organic component and an inorganic component in a hybrid material, which comprises:

controlling the content of an organic component and an inorganic component in a hybrid material, by adding a substance containing the element for the tetrahedral site but to which no organic portion is bonded to the substance containing the element for the tetrahedral site at a predetermined quantity ratio and the organic portion bonded thereto by covalent bond.

Another controlling step may comprise:

controlling the content of an organic component and an inorganic component in the hybrid material by controlling the gross number of functional group of the first organic portion which is capable of bonding with a second organic portion and bonding the second organic portion to the functional group of said first organic portion.

According to a fourth aspect of the present invention, there is provided a surface hardening material comprising:

a layer containing an octahedral sheet comprising octahedra linked with each other to provide a sheet-like structure and a tetrahedral sheet comprising tetrahedra linked with each other to provide a sheet-like structure, said tetrahedral sheet being linked to said octahedral sheet by plane to plane; and an organic portion bonded by covalent bond to an element located at the tetrahedral site of the tetrahedra;

said octahedral sheet comprising octahedra each having an element at the octahedral site thereof with a valence in the range of from 3.5 to 4.5 on average over the entire octahedral sheet, and said tetrahedral sheet comprising tetrahedra each having an element at the tetrahedral site thereof with a valence in the range of from 4.5 to 5.5 on average over the entire tetrahedral sheet.

According to a fifth aspect of the present invention, there is provided a wrapping material comprising:

a layer containing an octahedral sheet comprising octahedra linked with each other to provide a sheet-like structure and a tetrahedral sheet comprising tetrahedra linked with each other to provide a sheet-like structure, said tetrahedral sheet being linked to said octahedral sheet by plane to plane, and an organic portion bonded by covalent bond to an element located at the tetrahedral site of the tetrahedra;

said octahedral sheet comprising octahedra each having an element at the octahedral site thereof with a valence in the range of from 3.5 to 4.5 on average over the entire octahedral sheet, and said tetrahedral sheet comprising tetrahedra each having an element at the tetrahedral site thereof with a valence in the range of from 4.5 to 5.5 on average over the entire tetrahedral sheet.

According to a sixth aspect of the present invention, there is provided an ultraviolet radiation absorber comprising:

a layer containing an octahedral sheet comprising octahedra linked with each other to provide a sheet-like structure and a tetrahedral sheet comprising tetrahedra linked with each other to provide a sheet-like structure, said tetrahedral sheet being linked to said octahedral sheet by plane to plane; and an organic portion bonded by covalent bond to an element located at the tetrahedral site of the tetrahedra;

said octahedral sheet comprising octahedra each having titanium or cerium at the octahedral site thereof, and said tetrahedral sheet comprising tetrahedra each having an element at the tetrahedral site thereof with a valence in the range of from 4.5 to 5.5 on average over the entire tetrahedral sheet.

According to a seventh aspect of the present invention, there is provided an electron donor comprising:

a layer containing an octahedral sheet comprising octahedra linked with each other to provide a sheet-like structure and a tetrahedral sheet comprising tetrahedra linked with each other to provide a sheet-like structure, said tetrahedral sheet being linked to said octahedral sheet by plane to plane; and an aromatic organic group bonded by covalent bond to the element located at the tetrahedral site of the tetrahedra;

said octahedral sheet comprising octahedra each having an element at the octahedral site thereof with a valence in the range of from 3.5 to 4.5 on average over the entire octahedral sheet, said tetrahedral sheet comprising tetrahedra each having an element at the tetrahedral site thereof with a valence in the range of from 4.5 to 5.5 on average over the entire tetrahedral sheet, and said layer being doped with transition metal ions, wherein the electron donor is an anion polymerization initiator.

The hybrid material according to the present invention comprise an organic portion bonded by covalent bond to the tetrahedral element of the tetrahedra constituting the tetrahedral sheet. Accordingly, there is no need of rendering the organic portion cationic as in the conventional hybrid materials based on a clay mineral or zirconium phosphate. This signifies that any type of organic molecule can be bonded to the inorganic material, and that almost all of the organic molecules can be used to produce a hybrid material. Moreover, the present invention allows the use of a polymer extensively used in the industry, which utilizes an ionic substance in the synthetic stage thereof (for instance, 4,6-nylon, 6,6-nylon, 6,10-nylon, 6,12-nylon, and others obtained by effecting condensation polymerization after once synthesizing a nylon salt), or of a polyolefin such as polypropylene. Thus, the present invention enables designing a substance comprising an organic portion bonded to the tetrahedral element of the tetrahedra from the synthetic step thereof.

Furthermore, the hybrid material according to the present invention can be obtained in large crystals, because the organic portion is bonded by covalent bond to the tetrahedral element. Thus, the mechanical properties and the gas permeability of the resulting composite can be controlled.

The hybrid material according to the present invention allows the use of a material selected from a wide variety of organic materials, such as polyamides and polypropylene.

The gas permeability and the mechanical properties of the hybrid material according to the present invention can be controlled, because larger crystal sizes are achieved in the present hybrid material.

In the present invention, as the basal spacing of the layers becomes greater, the hybrid material more readily exhibits properties inherent in the organic portion present between the layers. Accordingly, the basal spacing preferably averages 4.4 nm or more. With the spacing falling within this range, the organic portion present between the layers would exhibit excellent tensile strength, moldability, and so on without being affected by the inorganic compound of the layer. More preferably, an average basal spacing is 5.0 nm or more.

Herein, an average basal spacing means the mean value of the spacing between the center of gravity of one layer and that of another one. The value is available by mathematically averaging basal spacings, even if layers are dispersed uniformly, or aggregated by contacting with each other. This average basal spacing can be obtained by x-ray diffraction, as shown in the Examples. Specifically, as illustrated in FIG. 7, it can be calculated by using x-ray diffraction peaks when $2\theta$ is 10° or less, from the following Bragg's formula:

$\lambda = 2d \sin \theta$ ($\lambda$: x-ray wavelength, $d$: spacing between the planes, $\theta$: diffraction angle).

Why the hybrid material with the basal spacing of 4.4 nm or more, more preferably 5.0 nm or more, can exhibit excellent tensile strength, moldability, and so on has not been clarified yet.

Following is just speculation to help understanding the result performed by the structure of the present invention. Presuming that layers having an organic portion therebetween are arranged in parallel, the greater the number of the carbon atoms is, the longer the chain of the organic portion and the greater the basal spacing (spacing between the center of gravities of the layers) is. Further, if the layers are zirconium phosphate type layers, the thickness thereof is about 1.1 nm. If the organic portion is linearly-chained hydrocarbon, an organic portion comprising six carbon atoms as one unit has the length of about 1.1 nm. If 6,6-nylon is employed as an organic portion, the basal spacing should be 3.3 nm wherein the distance from the center of gravity to the surface of the layer is about 0.55 nm, and the length of the organic portion is about 2.2 nm for the nylon having two units of a hydrocarbon chain. In this case, the distance from the gravity center of a layer to the center of the space between layers measures 1.65 nm. This is too short for the organic portion to affect entire properties of the hybrid material. Since the inorganic component dominates the properties of the material, desirable properties inherent in the organic portion can not be expected.

When another unit of the organic portion (constituted by six carbon atoms) is further added, the added organic portion will be sufficiently far from the layers to exhibit its properties without being affected by the layers. In this case, the basal spacing becomes about 4.4 nm, because about 1.1 nm of a single unit is added to about 3.3 nm.

Furthermore, another half of a unit—about 0.6 nm, may be added to make longer the length of the organic portion, thereby readily exhibiting properties inherent in the organic portion. In this case, the basal spacing becomes 5.0 nm.

It should be, however, noted that as the organic portion becomes longer and the basal spacing becomes larger, the quantity of the layers themselves becomes smaller. This detracts the properties such as heat resistance, gas barrier ability, and the like inherent in organic compound of the layers. In view of that, the upper limit of an average basal spacing is preferably 100 nm.

As discussed hereinabove, the basal spacing can be made larger by increasing molecular weight of the organic portion bonded by covalent bond with tetrahedral elements or the number of carbon atoms of linearly chained organic molecule.

The above and other objects, features and advantages of the present invention will become more apparent from the following description when taken in conjunction with the accompanying drawings in which a preferred embodiment of the invention is shown by way of illustrative examples.

DETAILED DESCRIPTION OF THE INVENTION

A hybrid material according to a first aspect of the present invention comprises a layer containing an octahedral sheet comprising octahedra linked with each other to provide a sheet-like structure and a tetrahedral sheet comprising tetrahedra linked with each other to provide a sheet-like structure, and an organic portion bonded by covalent bond to an element located at the tetrahedral site of the tetrahedra constituting the layer, provided that the octahedral sheet comprises octahedra each having an element at the octahedral site thereof with a valence in a range of from 3.5 to 4.5 on the average over the entire octahedral sheet, and that the tetrahedral sheet comprises tetrahedra each having an element at the tetrahedral site thereof with a valence in a range of from 4.5 to 5.5 on the average over the entire tetrahedral sheet.

The hybrid material according to the present invention comprises an octahedral sheet having an average valence in a range of from 3.5 to 4.5 for the octahedral element of the octahedra over the entire octahedral sheet, and a tetrahedral sheet having an average valence in a range of from 4.5 to 5.5 for the tetrahedral element of the tetrahedra over the entire tetrahedral sheet. Accordingly, an organic portion can be bonded by covalent bond to the element at the tetrahedral site of the tetrahedra constituting the tetrahedral sheet.

Figure 1:
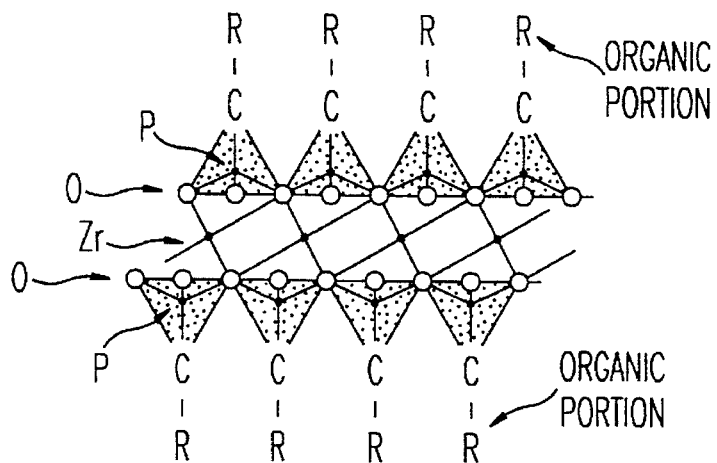
FIG. 1 is a schematically drawn structure of a hybrid material according to an embodiment of the present invention.

More specifically, referring to the schematically drawn structure in FIG. 1, an organic portion can be bonded to the element at the tetrahedral site of a tetrahedron by covalent bond in case the basal plane of the tetrahedron is bonded to the side planes of the octahedron, and the apex is located on the outer side of the tetrahedron (i.e., in the layer, on the side opposite to the octahedral sheet). In this manner, carbon atom of the organic portion can be shared at the apices of the tetrahedra to form a covalence bond between the organic portions and the elements located at the tetrahedral sites of the tetrahedra.

For instance, in case the tetrahedral elements of the tetrahedra constituting the tetrahedral sheet have an average valence of 5, a monovalent electron can be supplied from the element at the apex located on the outer side of a tetrahedron to form a covalent bond, and the rest of the apical elements (three elements) each supply a ⅓-valent electron. Each of the three apical elements remain with a valence of ⅔ (2−⅘=⅔). Thus, six anions each having a valence of ⅔ surround the element located at the octahedral site of the octahedron. To cancel out the negative valence of the six anions, the octahedral element of the octahedra must have an average valence of 4 on average over the entire octahedral sheet. The average valence of the octahedral element and that of the tetrahedral element may fluctuate around 4 and 5, respectively. More specifically, the average valence of the octahedral element can be a value in a range of from 3.5 to 4.5, and the average valence of the tetrahedral element can be a value of from 4.5 to 5.5. In case of an octahedral sheet, the deviation of the valence of 4.0 for the octahedral element can be compensated by deviating the valence of the tetrahedral element in such a manner that the charge of the layer as a whole may be neutral. Otherwise, an interlayer cation corresponding to the charge deviation can be introduced to neutralize the charge of the entire structure.

The element located at the octahedral site of the octahedra constituting the octahedral sheet must have an average valence in a range of from 3.5 to 4.5 over the entire sheet. Specific examples of the octahedral element include a Group IVa element of the periodic table such as titanium (Ti), zirconium (Zr), and hafnium (Hf); a Group VIb element such as silicon (Si), germanium (Ge), tin (Sn), and lead (Pb); or an element belonging to other groups but which is capable of taking a tetravalent state, such as cerium (Ce). For the octahedral site, not only a single element, but also two or more elements can be employed.

The element located at the tetrahedral site of the tetrahedra constituting the tetrahedral sheet must have an average valence in a range of from 4.5 to 5.5 over the entire sheet. Specific examples of the tetrahedral elements include an element capable of taking a pentavalent state, such as a Group Vb element of the periodic table such as phosphorus (P), arsenic (As), antimony (Sb), and bismuth (Bi); or a Group Va element such as vanadium (V), niobium (Nb), and tantalum (Ta). For the tetrahedral site, not only a single element, but also two or more elements can be employed.

Furthermore, the tetravalent element of the octahedral site may be replaced by yttrium (Y) and niobium (Nb), or the pentavalent element of the tetrahedral site may be replaced by Si or sulfur (S), so long as the octahedral elements in the octahedral sheet as a whole maintain an average valence in a range of from 3.5 to 4.5 and the tetrahedral elements in the tetrahedral sheet as a whole maintain an average valence in a range of from 4.5 to 5.5. Preferably, the octahedral elements in the octahedral sheet as a whole maintain an average valence of 4 and the tetrahedral elements in the tetrahedral sheet as a whole maintain an average valence of 5.

The octahedra comprises six elements, such as oxygen, placed around and bonded by covalent bond to the aforementioned octahedral element. By sharing corner atoms, the octahedra bond with each other to form an octahedral sheet. The tetrahedra, on the other hand, comprises three elements, such as oxygen, and carbon provided from an organic portion, placed around and bonded by covalent bond to the aforementioned tetrahedral element. These nearest neighbor elements are bonded to the tetrahedral element by covalent bond to form a tetrahedron. The tetrahedra bond with each other to form a tetrahedral sheet. The octahedra and the tetrahedra form a layered structure by sharing the corner elements such as oxygen. The layer is formed in this manner. In both of the octahedra and the tetrahedra, the corner elements distributed around the octahedral site and the tetrahedral site may be any element capable of forming a covalent bond with the elements located at the octahedral site and the tetrahedral site of the octahedra and the tetrahedra. Specifically mentioned as the corner element include oxygen.

The layer comprising a layered structure of a tetrahedral sheet and an octahedral sheet preferably has a zirconium phosphate structure as shown in FIG. 1.

Referring to FIG. 1, a zirconium phosphate structure comprises an octahedron containing, for instance, zirconium atom as the element for the octahedral site, and six atoms of an element such as oxygen which surround the octahedral element. The surrounding elements are bonded to the octahedral element by covalent bond. The structure also comprises a tetrahedron containing, for instance, phosphorus atom as the element for the tetrahedral site, and four atoms of an element such as oxygen which surround the octahedral element. The surrounding elements are bonded to the tetrahedral element by covalent bond. By sharing the corner elements, the octahedra and the tetrahedra separately form an octahedral sheet and a tetrahedral sheet, respectively. An octahedron is bonded to a tetrahedron by sharing the side plane of the octahedron with the basal plane of the tetrahedron. In other words, three corner elements, e.g., oxygen atoms, of the octahedron also function as the three corner elements (oxygen atoms) of the tetrahedron to bond the octahedron to the tetrahedron. In a zirconium phosphate structure, two tetrahedral sheets are bonded to both sides of a single octahedral sheet. Furthermore, carbon atom (C) of the organic portion is located at the oxygen site on the outer side of the tetrahedron (the corner oxygen which is not shared with an octahedron). Thus, the organic portion is bonded by covalent bond to the tetrahedral element.

The layer having the zirconium phosphate structure can be expressed by a molecular formula of $Me[XO_3 \cdot R]_2$, where Me represents at least one element selected from the group consisting of titanium (Ti), zirconium (Zr), germanium (Ge), tin (Sn), lead (Pb), and cerium (Ce); X represents at least one selected from the group consisting of phosphorus (P) and arsenic (As); and R represents an organic portion; provided that the element expressed by X is bonded by covalent bond to the organic portion represented by R.

Figure 2:
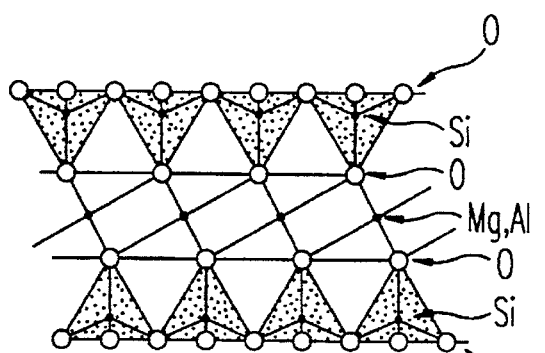
FIG. 2 is a schematically drawn structure of a clay mineral.

A layer of a zirconium phosphate structure can be obtained even when a trivalent aluminum (Al) or a tetravalent silicon (Si) is used in the place of the pentavalent element, such as phosphorus (P), for the tetrahedral element. However, in case of using an element other than a pentavalent element, particularly a tetravalent element well known in a clay mineral, the surrounding four oxygen ions must each supply a $1/4$-valent, i.e., a monovalent electron on the average. In such a case, each of the oxygen must also supply a $1/2$-valent, i.e., a monovalent electron to bond to the neighbor silicon or to form an ionic bond with the octahedron. Thus, an Si—O—Si bond is also formed to result in a structure represented by a clay mineral as illustrated in FIG. 2. Accordingly, a zirconium phosphate structure cannot be obtained.

In case a pentavalent element such as phosphorus is provided as the element for the tetrahedral site of the tetrahedron, the tetrahedral element forms a covalent bond with the apical oxygen atom pointed outward by attracting a monovalent electron therefrom, while receiving $1/3$-valent electrons each from the other three oxygen atoms. Each of the three oxygen atoms remains with $2/3$ valence $(2-4/3=2/3)$. This results in such a structure comprising a tetrahedral element surrounded by six $2/3$-valent anions. Thus, the average valence of the octahedral element for the entire octahedral sheet must be tetravalent $(2/3 \times 6 = 4)$. The discussion above is based on the well-known so-called Pauling's rule which describes the coordination of inorganic crystals. A structure according to Pauling's rule can be implemented by providing an octahedral element with a valence of from 3.5 to 4.5 and a tetrahedral element with a valence of from 4.5 to 5.5.

The octahedral element is preferably at least one selected from the Group consisting of titanium (Ti), zirconium (Zr), Germanium (Ge), tin (Sn), lead (Pb), and cerium (Ce). Particularly preferred is to select at least one element from the Group consisting of Zr, Ti, and Ce. The tetrahedral element is at least one selected from the group consisting of phosphorus and arsenic. The structure thus obtained is relatively stable; furthermore, the starting materials therefore are also stable, and are readily and industrially available.

A layer comprising two tetrahedral sheets each bonded to each side of an octahedral sheet is known in the art. However, no layered zirconium phosphate comprising one each of the sheets above in a manner similar to that of a clay mineral, kaolinite is known, nor a synthetic product of this type is reported to the present. In view of Pauling's rule, the oxygen atoms constituting the octahedra must have a valence of $2/3$. Thus, if only one tetrahedral sheet were to be bonded to one side of the octahedral sheet, the total oxygen valence will be insufficient to provide a kaolinite-like structure.

According to the hybrid material of the present invention, the average valence of the octahedral element for the octahedra over the entire octahedral sheet is in a range of from 3.5 to 4.5, and the average valence of the tetrahedral element for the tetrahedra over the entire tetrahedral sheet is in a range of from 4.5 to 5.5. However, the octahedral site or the tetrahedral site may be vacant. In such a case, the octahedral site or the tetrahedral site is regarded as having a valence of zero.

In addition to the defects represented by vacancies above, the layer may contain line defects attributed to the loss of regular ordering in crystals, or a glassy structure comprising a partially amorphous portion.

In a zirconium phosphate structure, however, the ideal structure above remains the same even if an organic portion (R) were to be bonded thereto, and without incorporating a defect described above. Accordingly, it is possible to obtain a defect-free layer composed of continuously bonded single crystals over a length of several millimeters or even longer. Furthermore, because organic portions are bonded previously to the layer, a composite using coarse crystals can be readily formed therefrom and a polymer.

It is also possible to introduce organic portions into a zirconium phosphate structure without inducing defects in the crystal structure. Moreover, a perfect and coarse crystal can be obtained free of problems such as consuming much time. Thus, organic portions can be regularly and densely arranged along the host, i.e., the layer. Accordingly, even if the content of the organic polymer should be increased, the polymer can still reflect the structure of the host, i.e., the layer. By taking advantage of these characteristics, the water resistance of a polyamide, or the heat resistance as well as the weathering resistance inherent in most of the thermoplastic polymers can be exhibited effectively by the composite.

Figure 3:
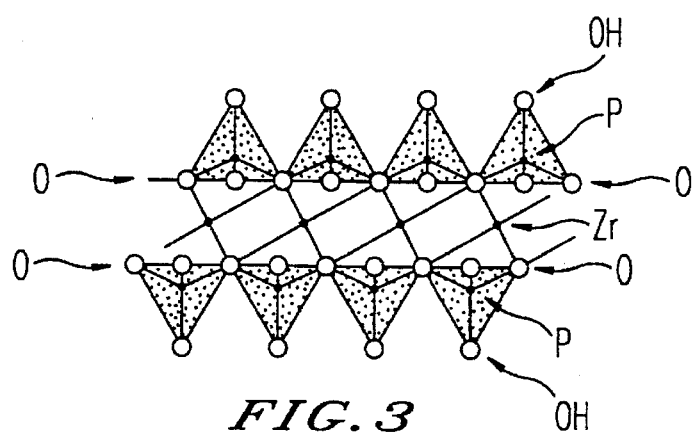
FIG. 3 is a schematically drawn structure of zirconium phosphate.

The desired hybrid material can be obtained by forming a layer comprising continuous structural unit of at least about 10 Å, and the resulting hybrid material can be used as a catalyst. A common zirconium phosphate of a type as shown in FIG. 3 inevitably involves a crystallization step effected by means of a hydrothermal reaction and the like. Thus, the resulting zirconium phosphate is obtained with a continuous structural unit of 100 Å or longer. On the other hand, the organic derivative of zirconium phosphate constituting the layer according to the present invention aims to develop a layered structure from the synthetic step at room temperature by taking advantage of the interaction between the organic portions. Accordingly, a layer comprising minimum structural units 10 Å in length can be combined into a continuous structure capable of forming a composite.

In the hybrid material according to the present invention, the organic portion expressed by R may be of any kind, so long as it contains a carbon (C) atom which can be directly bonded to the inorganic element (X) located at the tetrahedral site of the tetrahedra. That is, any organic molecule can be used irrespective of it being a monomer or a polymer.

More specifically, organic portions suitable for use above as R include an aliphatic hydrocarbon group, an alicyclic hydrocarbon group, an aromatic hydrocarbon group, an organic portion having a halogen such as fluorine or chlorine bonded thereto; a characteristic group containing an oxygen such as a hydroxyl group or an oxy group; a complex group such as an ether group, a carboxylic acid, an ester group, an acyl group, an acetonyl group, or an anisoyl group; a characteristic group containing sulfur such as a methylthio group; a characteristic group containing one nitrogen atom such as a methylamino group; a characteristic group containing two or more nitrogen atoms such as a phenylazo group; and a heterocyclic group. In the process according to the present invention, one group or a combination of two or more organic portions can be used.

If an organic portion having an unsaturated group such as a vinyl group or an acrylic group is used among the organic portions above, a hybrid material comprising a bridged polymer or a copolymer with an olefin (e.g., ethylene, propylene, butadiene, isoprene, and isobutylene), a vinyl compound (e.g., styrene, vinyl chloride, and vinyl acetate), or an acrylic compound (e.g., methyl methacrylate) can be obtained by bringing the organic portion into contact with the polymerizable compounds enumerated above.

A second organic portion may be further bonded to the functional group thereof. The second organic portion may be a polymer or a monomer.

In case the organic portion is an amine or a carboxylate group, the organic portion can be polymerized with a lactam, a diamine, or a dicarboxylic acid to form an amido bond.

A lactam is selected from the group consisting of butylolactam, pivalolactam, caprolactam, caprylolactam, enantholactam, undecanolactam, and dodecanolactam. One or a combination of two or more selected from the group may be used.

A diamine may be selected from the group consisting of an aliphatic chain diamine such as trimethylenediamine, tetramethylenediamine, pentamthylenediamine, hexamethylenediamine, octamethylenediamine, decamethylenediamine, dodecamethylenediamine, 2,2,4- or 2,4,4-trimethylhexamethylenediamine; an aromatic diamine such as phenylenediamine or xylylenediamine; or an alicyclic diamine. One or a combination of two or more selected therefrom can be used.

Usable dicarboxylic acid is selected from an aliphatic chain dicarboxylic acid such as adipic acid, pimelic acid, glutamic acid, suberic acid, octadecanoic diacid, or sebacic acid; an aromatic dicarboxylic acid such as terephthalic acid and or isophthalic acid; or an alicyclic dicarboxylic acid. One or a combination of two or more selected therefrom can be used.

From the viewpoint of availability of the material, price, etc., and among the materials above, caprolactam or dodecalactam is preferred as a lactam; hexamethylenediamine or tetramethylenediamine is preferred as a diamine; and adipic acid or sebacic acid is preferred as a dicarboxylic acid.

Thus, a hybrid material comprising a polyamide resin containing unit layers of zirconium phosphate based layered substance bonded to the matrix by covalent bond can be obtained by heating a polymerizable material selected from those above together with a catalyst such as an amine or a carboxylic acid, or with a layered zirconium phosphate based compound having an amino group or a carboxylic group bonded thereto.

By using ethylene glycol and the like as a polymerization initiator in case the organic portion described above has an ester group, the organic portion can be polymerized with a lactone such as caprolactone by an ester bond. Furthermore, in case the organic portion is an epoxy group, a phenolic group, etc., the organic portion may be bonded to an epoxy resin or phenolic resin by incorporating an amine, a formamide, etc.

As described above, a polymer can be bonded to the functional group belonging to an organic portion of the hybrid material according to the present invention. Furthermore, the organic portion itself may be a polymer. The both ends of the polymer thus bonded may be further bonded to the inorganic layer, or only one end thereof may be bonded to the layer. An active group may remain in the polymer. Otherwise, a constitution as such in which the polymer chains are bridged by the layer may be employed.

In case the both ends of the polymer are bonded to the layer (i.e., in case one end of the polymer is bonded to a first layer and the other end is bonded to another layer neighboring to the first layer), the polymer chains densely arrange between the unit layers. Furthermore, in such a case, because no active groups remain therein, a hybrid material having excellent stability and a certain degree of rigidity can be obtained, yet free from embrittlement.

In case only one end is bonded to the layer, the polymer molecular chain can move relatively freely. Thus, a hybrid material imparted with excellent moldability can be obtained.

In case the polymer results with a bridged morphology, a molding can be readily obtained with a hybrid material containing less quantity of an organic molecule. Thus, a hybrid material having excellent properties concerning heat resistance and hardness can be obtained.

In the hybrid material according to the present invention, the characteristics inherent in the organic portion intercalated between the layers are more clearly exhibited with increasing distance between the layers. From this point of view, an average interlayer spacing is preferably 4.4 nm or more. By setting the interlayer spacing in a range of 4.4 nm or more, the organic portion intercalated between the layers can freely exhibit the favorable characteristics concerning, e.g., tensile strength and moldability. More preferably, an average interlayer spacing is 5.0 nm or more.

The basal spacing between the layers can be increased by increasing the molecular weight of the organic portion bonded by covalent bond to the tetrahedral element of the tetrahedra constituting the layer, or by increasing the number of carbon atoms in the straight chain.

The hybrid material according to the present invention can be used as an ultraviolet (UV) radiation absorber by properly selecting the element constituting the inorganic component. For instance, by using titanium or cerium as the octahedral element for the octahedral sheet constituting the layer, a UV-absorbing function can be imparted to the resulting hybrid material. Furthermore, the hybrid material according to the present invention is usable as a coating material for resins and wood materials (surface hardening agent) by taking advantage of the inherent characteristics concerning heat resistance and hardness. The hybrid material according to the present invention is also applicable to automobile parts or to machine parts by making the best of excellent rigidity and toughness thereof when used as a molding. It is also possible to use the hybrid material as a wrapping material by utilizing the barrier function on gas permeation, and, since the material is heat resistant, in addition, it can be used as an IC packaging resin and the like in the fabrication of electronic components. Furthermore, an optical or an electromagnetic element such as a light-emitting element or an electric conductor can be implemented by further intercalating an array of organic portions having electrons in excess, e.g., phenyl groups and vinyl groups. By taking such a constitution, the electron-rich organic portions or the organic portions having additional electrons incorporated therein by adding metallic ions or halogen molecules are allowed to react with each other. It is also possible to impart an optical or an electromagnetic function to the hybrid material by controlling the type of the metal used in the layer or the alignment of the organic portions. The hybrid material according to the present invention may be combined with fibrous materials such as glass fibers or sepiolite, platy materials such as micas and talc, or other types of materials such as silica gel.

In the of using a zirconium phosphate-type layer as the layer of the hybrid material of the present invention, the organic to be bonded to the tetrahedral element of the tetrahedra may be selected not only from the organic portions capable of forming a direct bond with an organic polymer, but also from the groups having a function as an initiator for radical polymerization (e.g., a peroxide, an azo group, a disulfide group, a metallic carbonyl group, or a metallic phenyl complex), a group which functions as an initiator for anion polymerization such as a metallic alkyl group, a group which functions as an initiator for cation polymerization, a polymerization initiator such as an amino group or a carboxyl group which initiates condensation polymerization of nylon and the like, or a polymerization inhibitor or retarder such as a diphenyl or a nitrophneyl or a nitro group. Thus, the structure and the properties of the hybrid material can be controlled in various ways.

In case an aromatic group such as a phenyl group or a naphthyl group is bonded to the tetrahedral group of the tetrahedra, it has been found that the aromatic rings align themselves densely and approximately in parallel with each other due to the restriction posed by the size of the organic portion. By doping a transition metal element such as Fe, Ni, Co, Ti, Zr, or Hf to the hybrid material of such a structure, a hybrid material which functions as an electron donor can be obtained. As a result, a material which exhibits an optical function, i.e., a novel type of light-emitting function, can be obtained. The electron donor thus obtained also functions as an initiator for anion polymerization. More specifically, accordingly, it can be used as an initiator for the anion polymerization of polyolefins such as polypropylene, as well as of lactams.

The process for producing a hybrid material according to a second aspect of the present invention comprises reacting a substance containing an octahedral element for the octahedra constituting an octahedral sheet with a substance containing the elements constituting the octahedra except for the element at the octahedral site, and also with a substance containing a tetrahedral element for the tetrahedra constituting a tetrahedral sheet and an organic portion bonded by covalent bond to the tetrahedral element, in such a manner that the valence of the octahedral elements averaged over the entire octahedral sheet may fall in a range of from 3.5 to 4.5, and that the valence of the tetrahedral elements averaged over the entire tetrahedral sheet may fall in a range of from 4.5 to 5.5.

That is, a hybrid material according to the first aspect of the present invention can be implemented by a process which simply comprises reacting three types of substances.

More specifically, the process for producing a hybrid material according to the present invention comprises reacting a substance containing an octahedral element expressed by "Me" for the octahedra constituting the octahedral sheet, with a substance containing the elements constituting the octahedra except for the element expressed by Me, and also with a substance containing a tetrahedral element expressed by "X" for the tetrahedra constituting the tetrahedral sheet and an organic portion bonded by covalent bond to the element expressed by X, in such a manner that the average valence of the Me over the entire octahedral sheet may fall in a range of from 3.5 to 4.5, and that the average valence of the X over the entire tetrahedral sheet may fall in a range of from 4.5 to 5.5. In this manner, the octahedra can be bonded to make an octahedral sheet, and the tetrahedra make a tetrahedral sheet. The both sheets form a layered structure (layer). Because the tetrahedral element X and the organic portion are bonded to each other by covalent bond, the layer thus generated retains the covalent bond between X and the organic portion.

In case a hybrid material comprising a zirconium phosphate-type layer expressed by $Me[XO_3.R]_2$, where Me represents at least one element selected from the group consisting of titanium, zirconium, germanium, tin, lead, and cerium; X represents at least one selected from the group consisting of phosphorus and arsenic; and R represents an organic portion is produced, and in case the element expressed by X is bonded by covalent bond to the organic portion represented by R, the hybrid material is formed according to the reaction described below.

By reacting the substance containing the tetrahedral element expressed by X and an organic portion expressed by R bonded by covalent bond to the element X with a substance containing the octahedral element expressed by Me and with a substance containing an element other than Me, e.g., an oxygen, a zirconium phosphate structure is synthesized according to the following reaction scheme:

$$2R-PO(OH)_2 + MeOX_2 \rightarrow Me(R-PO_3)_2 + 2HX + 2H_2O \quad (1)$$

$$2R-POX'_2 + MeOX_2 + 3H_2O \rightarrow Me(R-PO_3)_2 + 2HX + 4HX' \quad (2)$$

$$2R-PO(OH)_2 + MeX_4 \rightarrow Me(R-PO_3)_2 + 4HX \quad (3)$$

$$2R-PO(OR')_2 + MeOX_2 + 3H_2O \rightarrow Me(R-PO_3)_2 + 2HX + 2R'OH \quad (4)$$

where, X and X' each represent a halogen ion; and OR' represents an alkoxide. In general, a zirconium phosphate compound is produced according to a reaction expressed by:

$$2H_3PO_3 + ZrOCl_2 \rightarrow Zr(HPO_3)_2 + 2HCl \quad (5)$$

and only H$^+$ ions align on the surface of the layer. Accordingly, the resulting zirconium phosphate hardly undergoes an instantaneous crystallization. However, in an organic derivative of zirconium phosphate, organic portion expressed by R align on the surface of the layer, and also densely. Because the formation of a layered alignment is accelerated by the Van der Waals' interaction or the hydrogen bond among the organic portion represented by R, it is assumed that a layered structure is realized even in the reaction at room temperature.

A compound having a zirconium phosphate structure is generally synthesized by reacting phosphoric acid with a halide of a metal (Me) for the octahedral site (expressed by MeX$_m$, where X represents a halogen atom such as Cl, Br, and I; and m is generally an integer of 4) or an acid halide (expressed by MeOX$_n$, where n is generally an integer of 2). By using an acid oxyhydrate expressed by R—PO(OH)$_2$, or a metal salt thereof (expressed by R—PO(OMe)$_2$, where Me represents sodium, potassium, etc.), or an acid halide expressed by R—POX$_2$ in the place of phosphoric acid in the reaction above, an organic derivative of the zirconium phosphate containing a directly bonded organic portion can be obtained.

More specifically, usable phosphorus compounds include an aromatic phosphorus compound such as phenylphosphonic acid, aminobenzylphosphonic acid, or naphthylphosphate; a straight chain aliphatic phosphonic acid such as methylphosphonic acid, ethylphosphonic acid, or propylphosphonic acid; a branched aliphatic phosphonic acid such as t-butylphosphonic acid; a phosphonic acid containing an amino group, such as aminomethylphosphonic acid, amino ether phosphonic acid, aminoethylphosphonic acid, or aminopropylphosphonic acid; a compound having a carboxylic group, such as 2-carboxylphosphoric acid or phosphonium acetic acid; an alkali metal salt of carbonyl, such as a sodium salt of phosphonium acid; an amino acid having an amino group and a carbonyl group, such as aminophosphonium propionic acid or aminophosphonic butyric acid; a p-alkoxide or a halide having an unsaturated bond, such as dimethylvinylphosphoric acid or allylphosphoric chloride; a phosphonic acid having a phosphate group, such as methylenediphosphonic acid; a phosphorus alkoxide containing sulfur on carbon, such as diethylmethylthiomethylphosphonate; a phosphorus alkoxide containing pyrrole, such as diethylpyrrolinomethylphosphonate;

an alkoxide containing an oxoalkyl, such as dimethyloxopropylphosphonate; a phosphorus alkoxide having an alkoxide on the terminal thereof, such as trimethylphosphonoacetic acid and ethyldimethylphosphonoacetic acid; a phosphorus alkoxide having crotonic acid or an ester, such as triethylphosphoric crotonate; a sodium salt of a phosphonic acid containing sulfur and an amino group, such as monosodium S-aminoethylthiophosphate; and a phosphate containing a saccharide bonded thereto, such as sodium ribosephosphate and sodium α-D-glucosephosphate. At least one compound selected from those enumerated above is used.

Thus, a solution of the phosphorus compound above is mixed at room temperature with (a) a substance containing a halide of an element (Me) for the octahedral site of the octahedra (e.g., a zirconium oxychloride, zirconium tetrachloride, titanium tetrachloride, or germanium tetrachloride) or an aqueous solution thereof; an aqueous solution of, e.g., cerium sulfate or cerium hydroxide; or an alkoxide such as titanium isopropoxide; and (b) a substance containing an element (e.g., oxygen) constituting the octahedra other than Me, in such a manner that phosphorus (P) or arsenic (As) is incorporated at a quantity twice as large as that of the octahedral element. A layered substance or a precursor thereof can be obtained as a precipitate. The concentration of the aqueous solutions or the alcoholic solutions containing the compounds above is not particularly restricted, but preferably, the solution contains P or As at a concentration of from 0.05 to 10M, and more preferably, from 0.1 to 2M. Similarly, the concentration of the solution containing the octahedral element such as zirconium is preferably controlled in a range of from 0.005 to 1M, and more preferably, in a range of from 0.01 to 0.05M.

In the reaction above, a crystallization treatment is preferably effected after synthesizing the hybrid material at room temperature. The crystallization treatment can be effected by, for instance, performing hydrothermal treatment in a sealed vessel in a temperature range of from 100° to 250° C., and by using HF as a catalyst, heating the resulting product at a temperature range of from 40° to 80° C. under reflux. It is not preferred to perform the treatment at a temperature of 250° C. or higher, not only because it requires an equipment resistant to a high pressure corresponding to the equilibrium water vapor pressure of 40 atoms or higher, but also because of the possibility of causing modification of the bonding organic portions.

Although depending on the type of the starting material, the starting materials in the process according to the present invention are reacted by heating the materials in a temperature range of from 10° to 200° C., more preferably, in a range of from 20° to 90° C. Furthermore, the substance containing the octahedral element and that containing the elements for the octahedra other than the octahedral element need not be the same. However, a single substance containing both of the octahedral element and the elements for the octahedra other than the octahedral element may be used as well.

Among the organic derivatives of zirconium phosphate type thus synthesized as the hybrid materials, the compound containing the organic portion having a functional group capable of forming a bond with an organic polymer is further mixed with an organic monomer, and subjected to a conventional polymerization reaction to obtain a hybrid material comprising an organic polymer bonded to the organic portion.

In case polyamide is used for the organic polymer above, a hybrid material containing polyamide can be obtained from a mixture of lactam and a compound having a carboxyl group or an amine group used as the starting material for the synthesis. The resulting mixture is sealed in a tube and heated to obtain the hybrid material. Specifically mentioned as the usable lactam include butylolactam, pivalolactam, caprolactam, caprylolactam, enantholactam, undecanolactam, and dodecanolactam. One or a combination of two or more selected from the group may be used.

To the mixture is added the zirconium phosphate type compound, and a catalyst, such as aminohexanoic acid, is added for polymerizing lactam. The desired hybrid material can be obtained by heating the resulting mixture in a polymerization tube at a temperature 270° C. or lower for a duration of from 1 to 24 hours.

A nylon salt can be formed at room temperature as an intercalated compound by reacting a first compound having a carboxyl group or an amino group in water with a diamine or a dicarbonyl compound having the same valence as that of the number of organic portions of the first compound. By further mixing a nylon salt produced though a reaction of an equivalent diamine or dicarbonyl compound with the resulting hybrid material, a nylon salt containing a zirconium phosphate type compound can be obtained. Thus, the two-step operation described above can be effected simultaneously to obtain a nylon salt containing a zirconium phosphate type compound. More specifically, the process above can be effected at room temperature by mixing and stirring a mixture of dicarboxylic acid and a zirconium phosphate type compound having a carbonyl group, to which a diamine containing amino groups equivalent to the number of carbonyl groups of the dicarboxylic acid is added. Otherwise, the same can be effected at room temperature on a mixture of diamine and a zirconium phosphate type compound having an amino group, to which dicarbonyl groups equivalent to the number of carbonyl groups of the amino groups are added. It is also possible to mix an amino-containing zirconium phosphate compound with a compound containing carbonyl groups. A hybrid material of polyamide can be obtained by heating the resulting nylon salt in a vessel equipped with a nitrogen-inlet pipe and a depressurizing cock at a temperature in a range of from 200° to 300° C. while flowing gaseous nitrogen or under reduced pressure.

A hybrid material containing polypropylene can be obtained by subjecting an organic portion containing an unsaturated bond, such as an allyl group, to a polymerization reaction with propylene in the presence of a catalyst such as titanium chloride. Other usable catalysts in the polymerization reaction include titanium tetrachloride on a magnesium chloride carrier or titanium trichloride on a magnesium chloride carrier. The hybrid material can be obtained in the see polymerization reaction commonly employed for producing a polyolefin.

It is also possible to previously mix a polymerizable monomer for a common organic polymer with a zirconium phosphate type compound having a group capable of forming a bond therewith to produce a composite with the polymer. Such additional polymers include a polymer containing a carbon-carbon bond for the principal chain (e.g., polystyrene, polyvinyl acetate, polybutadiene, or polyacetylene), a polymer containing oxygen in the principal chain thereof (e.g., polyether, polyacetal, polyester, or polycarbonate), a nitrogen-containing polymer (e.g., polyamine, polypeptide, polyurethane, polyimide, polyimidazole, polyoxazole, polypyrrole, or polyaniline), a sulfur-containing polymer (e.g., polysulfide or polysulfone), a phosphorus-containing polymer (e.g., polyphosphoric acid or polyphosphine), a condensation bridged polymer (e.g., a phenolic resin, a urea resin, a melamine resin, an epoxy resin, or an alkyd resin), or an addition-bridged polymer (e.g., a vinyl ester resin or an unsaturated polyester).

The method for controlling the content of an organic component and an inorganic component in a hybrid material according to a third aspect of the present invention comprises:

in producing a hybrid material by reacting a substance containing an octahedral element for the octahedra constituting an octahedral sheet with a substance containing the elements constituting the octahedra except for the element at the octahedral site, and also with a substance containing a tetrahedral element for the tetrahedra constituting a tetrahedral sheet and an organic portion bonded by covalent bond to the tetrahedral element, provided that the average valence of the octahedral elements over the entire octahedral sheet fall in a range of from 3.5 to 4.5, and that the average valence of the tetrahedral elements over the entire tetrahedral sheet fall in a range of from 4.5 to 5.5;

adding at a predetermined quantity ratio to the substance containing the element for the tetrahedral site and the organic group bonded thereto by covalent bond, the substance containing the element for the tetrahedral site but to which no organic portion is bonded.

Considering the process for producing a hybrid material according to the second aspect of the present invention, a part of the tetrahedra constituting the hybrid material can be left over with their tetrahedral elements (X) non-bonded to the organic portions. This can be achieved by adding, at a predetermined ratio, a substance having no organic portion bonded thereto to a substance containing the tetrahedral element and the organic portions bonded to the tetrahedral element. Thus, by controlling the quantity of the addition of the substance having no organic portions bonded thereto, it is possible to control the ratio of the organic portions, i.e., the content ratio of the organic component and the inorganic component.

By thus controlling the quantity of the organic component in a hybrid material, for instance, the density of bonds between an inorganic component and a polymer can be changed. Accordingly, the alignment of the polymer molecular chains as well as the bridged density among the molecules can be modified. Thus, the conflicting characteristics of a hybrid material, for instance, the mechanical properties such as the rigidity, toughness, heat resistance, or hardness, and the moldability, can be controlled relatively freely.

In the process according to the present invention, a substance containing an element for the tetrahedral site of the tetrahedra but having no organic portion bonded thereto is added at a predetermined quantity to a starting material which comprises an element for the tetrahedral site of the tetrahedra and an organic portion bonded thereto by covalent bond. In this manner, a hybrid material partially comprising tetrahedra having no organic portion bonded thereto can be obtained. Thus, by controlling the quantity of addition of the substance above, the content of the organic portions, i.e., the content of organic component in the hybrid material can be controlled.

Zirconium phosphate is generally synthesized by using phosphoric acid. In contrast to a general case, the process according to the present invention comprises reacting a compound of zirconium and the like with an organic phosphonic acid or an organic phosphoric acid having an organic portion bonded thereto. For instance, by performing synthesis in a manner similar to the above using an inorganic phosphoric acid and the organic phosphoric acid above in an aqueous solution, or in a mixed solution previously prepared using an alcohol, a layer comprising uniformly dispersed therein tetrahedra having hydroxyl groups bonded to the tetrahedral elements (X) and organic portions (R) bonded to X.

In case of obtaining an organic derivative of zirconium phosphate or a clay mineral by means of an ordinary ion exchange treatment, it is assumed possible to control the organic content by lowering the ion exchange ratio or by mixing ions. However, the size of the intercalated ions changes by the ion exchange treatment. As a result, in case of a reaction in which the interlayer spacing changes, the reaction tends to proceed concentrated on the reaction-initiated layer. Accordingly, unlike the method according to the present invention, it is difficult to uniformly disperse the organic portion over the entire layer by using an ordinary process.

Similar to zirconium phosphate of an ordinary type, the inorganic ions (e.g., $H^+$ in case of a hydroxyl group) bonded to the synthetically obtained X can be exchanged with another inorganic or organic cation by ion exchange treatment.

When organic portions account for approximately 100%, the organic portions align extremely densely on the surface of the layer. Moreover, because bonding occurs at a high ratio, improvements on mechanical properties such as rigidity and hardness as well as the coloring effect attributed to the alignment of the organic portions can be readily observed. When organic portions account for about 30%, hydrophobic effect as well as a reinforcing effect well comparable to those of an organic derivative of a clay mineral obtained by ion exchange treatment can be realized. In case of a rigid hybrid material having a phenyl group and the like in the organic portion thereof and which contains from 10 to 50% of organic portions, the interlayer region becomes more sparse to be expected to exhibit an adsorption effect. However, if the content of the organic portions becomes as low as 3% or even lower, the hybrid material is no longer a characteristic material, and is found almost the same as a common layered inorganic compound.

The bonding strength of the organic portion to the polymer can be varied by mixing the types of organic portions above. Accordingly, the alignment of the polymer molecule chains as well as the bridging density among the molecules can be controlled. Thus, the conflicting characteristics of a hybrid material, for instance, the mechanical properties such as the rigidity, toughness, heat resistance, or hardness, and the moldability, can be controlled relatively freely. It is also possible in the present method to determine the average size of the organic portion in such a manner that the organic portions may align with a proper density on the surface of the layer. The alignment of the organic portions on the surface of the layer and the relative structure of the organic portions with respect to the layer (more specifically, whether the organic portions are aligned in parallel with the layer or perpendicular to the layer) can be controlled in this manner. As a result, the characteristics of the hybrid material can be controlled by controlling the higher order structure of the polymer bonded to the organic portion or the electronic interaction between the organic portion and the added ions.

In case of producing a hybrid material comprising a zirconium phosphate type layer expressed by $Me[XO_3.R]_2$ (where Me represents at least one element selected from the group consisting of titanium, zirconium, germanium, tin, lead, and cerium; X represents at least one selected from the group consisting of phosphorus and arsenic; and R represents an organic portion; provided that the element expressed by X is bonded by covalent bond to the organic portion represented by R) by reacting a substance containing Me (where Me represents at least one element selected from the group consisting of titanium, zirconium, germanium, tin, lead, and cerium) with a substance containing oxygen as well as a substance containing X (which represents at least one selected from the group consisting of phosphorus and arsenic) and an R (an organic portion) bonded by covalent bond to X, a substance containing X non-bonded with R is added at a predetermined quantity ratio to a substance containing X and R bonded by covalent bond to X.

The method for controlling the content of an organic component and an inorganic component in a hybrid material according to a third aspect of the present invention comprises:

in producing a hybrid material by reacting a substance containing an octahedral element for the octahedra constituting an octahedral sheet and a substance containing the elements constituting the octahedra except for the element at the octahedral site, with a substance containing a tetrahedral element for the tetrahedra constituting a tetrahedral sheet and a first organic portion bonded by covalent bond to the tetrahedral element, provided that the average valence of the octahedral elements over the entire octahedral sheet fall in a range of from 3.5 to 4.5, and that the average valence of the tetrahedral elements over the entire tetrahedral sheet fall in a range of from 4.5 to 5.5;

controlling the number of functional groups of the first organic portion, said functional group being capable of bonding with a second organic portion; and bonding the second organic portion to the functional group of said first organic portion.

In the process for producing a hybrid material according to the second aspect of the present invention, the present method may further comprise controlling the number of functional groups capable of bonding to a second organic portion and bonding the second organic portion to the functional group of the first organic portion. In this manner, more second organic portion are bonded to the first organic portion having a larger number of functional groups. Thus, by controlling the number of the functional groups, the quantity of bonded second organic portion can also be controlled. Thus, the content of organic and inorganic component can be controlled.

As described above, the conflicting characteristics of a hybrid material, for instance, the mechanical properties such as the rigidity, toughness, heat resistance, or hardness, and the moldability, can be controlled relatively freely as described in the third aspect of the present invention by controlling the quantity of the organic component in the hybrid material.

The method according to the present invention comprises controlling the number of functional groups (capable of bonding to a second organic portion) of a first organic portion in a substance containing an element for the tetrahedral site of tetrahedra and the first organic portion bonded by covalent bond to said element. If, for instance, the number of the functional groups be zero, no second organic portion can be bonded to the particular organic portion. Reversely, the number of the second organic portion can be further increased by increasing the number of the aforementioned functional groups. Thus, the content of the organic portions, i.e., the content of organic component in the hybrid material can be controlled according to a manner described above.

An organic portion capable of bonding by covalent bond to the tetrahedral element of a tetrahedra include a group (A)

capable of further bonding to another compound or a polymer, such as a carbonyl group, an amino group, a group having an unsaturated carbon bond, an epoxy group, a phenolic group, an alkoxide group, an aminocarboxylic group, a sulfonate group, and a saccharide; and a group (B) which is not capable of further extending the bond by an ordinary reaction, such as a straight chain aliphatic group, a phenyl group, a branched aliphatic group, and an alcohol. After mixing the both in a manner described above in the process according to the second aspect of the present invention, the resulting mixture is reacted with a compound containing zirconium, titanium, etc., to obtain a layer to which the organic portions are uniformly bonded.

The technique according to the present invention enables, for the first time, uniformly dispersing organic portions differing from each other in the molecular size. The present invention uses no ion exchange treatment. A technique for uniformly dispersing an inorganic substance in an organic polymer has been conventionally employed, and is effective for improving mechanical properties such as rigidity and heat resistance. Thus, in case the organic portions capable of bonding to an organic polymer of group (B) above account for 100%, an effect as a hybrid material can be obtained. In case the organic portions of group (B) account for 0%, a highly stable material comprising polymers all bonded to X elements on the surface of the layer can be obtained. The moldability, such as the plasticity, of the hybrid material increases with increasing content of the organic portions belonging to group (B), whereas superior properties, e.g., rigidity and heat resistance, are obtained with increasing content of the organic portions belonging to group (A).

An improvement on mechanical properties such as rigidity and hardness, a coloring function, a water-repelling effect, a reinforcing effect, or an adsorption function, can be obtained by controlling the content of the organic component. Furthermore, by varying the content of the organic portions capable of bonding to a polymer, the density of bonding with a polymer can be changed. Thus, in the same manner as in the third aspect of the present invention, the alignment of polymer molecular chains as well as the bridging density among the molecules can be controlled.

In case of producing a hybrid material comprising a zirconium phosphate type layer expressed by $Me[XO_3.R]_2$ (where Me represents at least one element selected from the group consisting of titanium, zirconium, germanium, tin, lead, and cerium; X represents at least one selected from the group consisting of phosphorus and arsenic; and R represents an organic portion; provided that the element expressed by X is bonded by covalent bond to theorganic portion represented by R) by reacting a substance containing Me (where Me represents at least one element selected from the group consisting of titanium, zirconium, germanium, tin, lead, and cerium) with a substance containing oxygen, as well as a substance containing X (which represents at least one selected from the group consisting of phosphorus and arsenic) and an R (an organic portion) bonded by covalent bond to X, the number of functional groups capable of bonding to the second organic portions of R above is controlled.

The present invention is described in further detail by making reference to specific Examples below. In the examples described below, the term "basal spacing" signifies an average distance between two neighboring layers in case of regarding a layer of a zirconium phosphate type structure as one layer.

EXAMPLE 1

Figure 4:
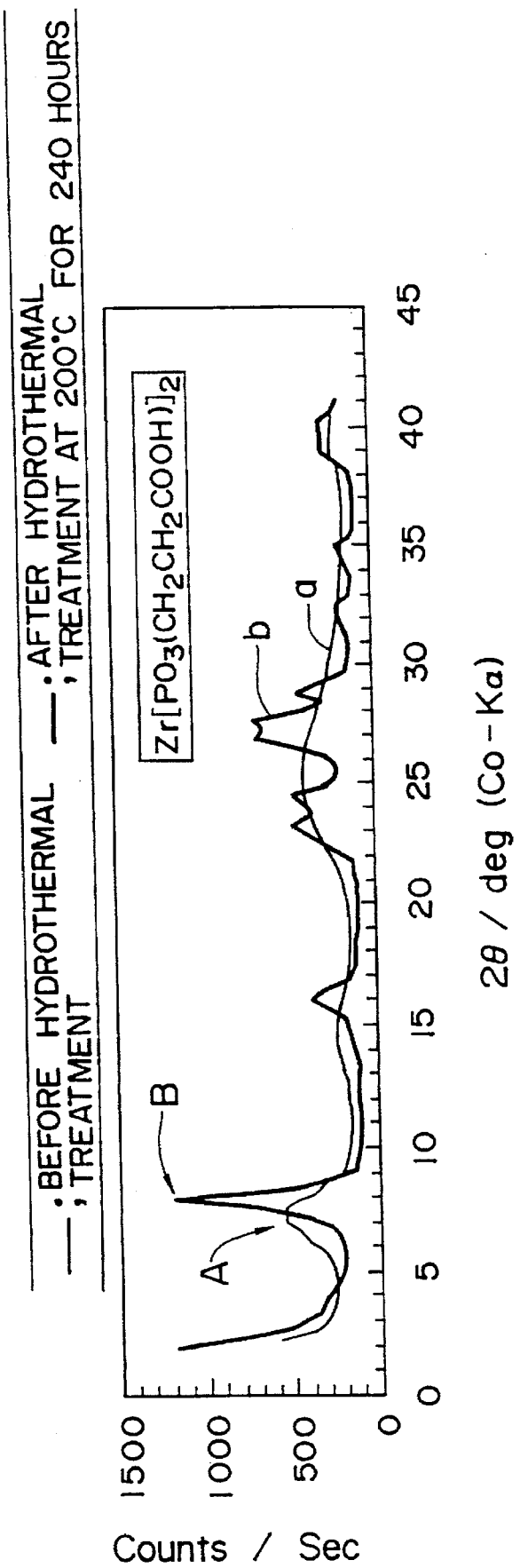
FIG. 4 is a diagram showing X-ray diffraction patterns of a hybrid material according to an embodiment of the present invention.

While stirring using a magnetic stirrer, a 1,000-ml portion of a 0.02M aqueous solution of zirconium oxychloride was added dropwise at room temperature into 50 ml of 0.8M aqueous solution of 2-carboxylphosphoric acid. The precipitate obtained through the reaction was filtrated and rinsed repeatedly until the pH value of the filtrate became 7. The resulting precipitate was subjected to vacuum drying at 30° C. for a duration of 10 hours. The powder thus obtained was investigated by means of X-ray diffraction using Cu-Kα radiation on system RAD-B (manufactured by Rigaku Corp.). FIG. 4 gives the X-ray diffraction pattern a for the product thus obtained. The X-ray diffractogram a yields a pattern similar to that of a substance having a zirconium phosphate structure, with a principal diffraction peak marked A. The diffractogram reads that a layered substance having a zirconium phosphate structure with a basal spacing of 1.6 nm is obtained. Infrared (IR) absorption spectrum obtained by IR absorption analysis is given in FIG. 5. The spectrum marked with a indicates that the product has a carboxyl group and a phosphate group. Considering that a substance (2-carboxylphosphoric acid) having both carboxyl group and phosphate group bonded by covalent bond is used as the starting material, it is confirmed that a compound of a zirconium phosphate type with 2-carboxylic acid bonded thereto by covalent bond is obtained. By taking the basal spacing obtained from the X-ray diffractogram marked with a in FIG. 4 and the presence of a COOH group indicated in the spectrum a of FIG. 5 into consideration, 2-carboxylic acid molecules are found to be aligned regularly on the surface of a unit layer in a manner shown schematically in FIG. 6.

A 2-g portion of the thus obtained powder product was mixed with 2-, 3-, or 4-g portion of ε-caprolactam in a mortar, and the resulting powder mixture was charged into a Pyrex glass tube. After drying the powder mixture inside the glass tube at 40° C. for a duration of 5 hours, the glass tube was sealed airtight. The glass tube with the powder mixture sealed therein was placed inside an oven maintained at a temperature of 260° C. to effect polymerization reaction for a duration of 10 hours. The reaction product was then taken out of the glass tube, and the low molecular product was removed by treating the product in a boiling water for a duration of 10 minutes. The resulting product was dried in vacuum at 80° C. for a duration of 24 hours. The basal spacing of the hybrid materials thus obtained were determined by means of X-ray diffraction, and the quantity ratio of the organic components to the inorganic components (organic/inorganic) were obtained by means of thermogravimetric analysis (TG). The results obtained by X-ray diffraction are given in FIG. 7. The basal spacings for each of the products were determined from peaks marked with A, B, and C, and is given in Table 1. The curves obtained by TG are shown in FIGS. 8 to 11, and are marked with a. The quantity ratio (organic/inorganic) was obtained by combusting the hybrid material at a temperature in a range of from 200° to 500° C., and the measured weight loss (the quantity of the organic matter removed by combustion) is given as a curve marked with a. Thus, the quantity ratio is calculated by taking the case containing 0% of 6-nylon as a standard (see FIG. 8). The results are given in Table 1 as 6-nylon content.

TABLE 1

Figure 7:
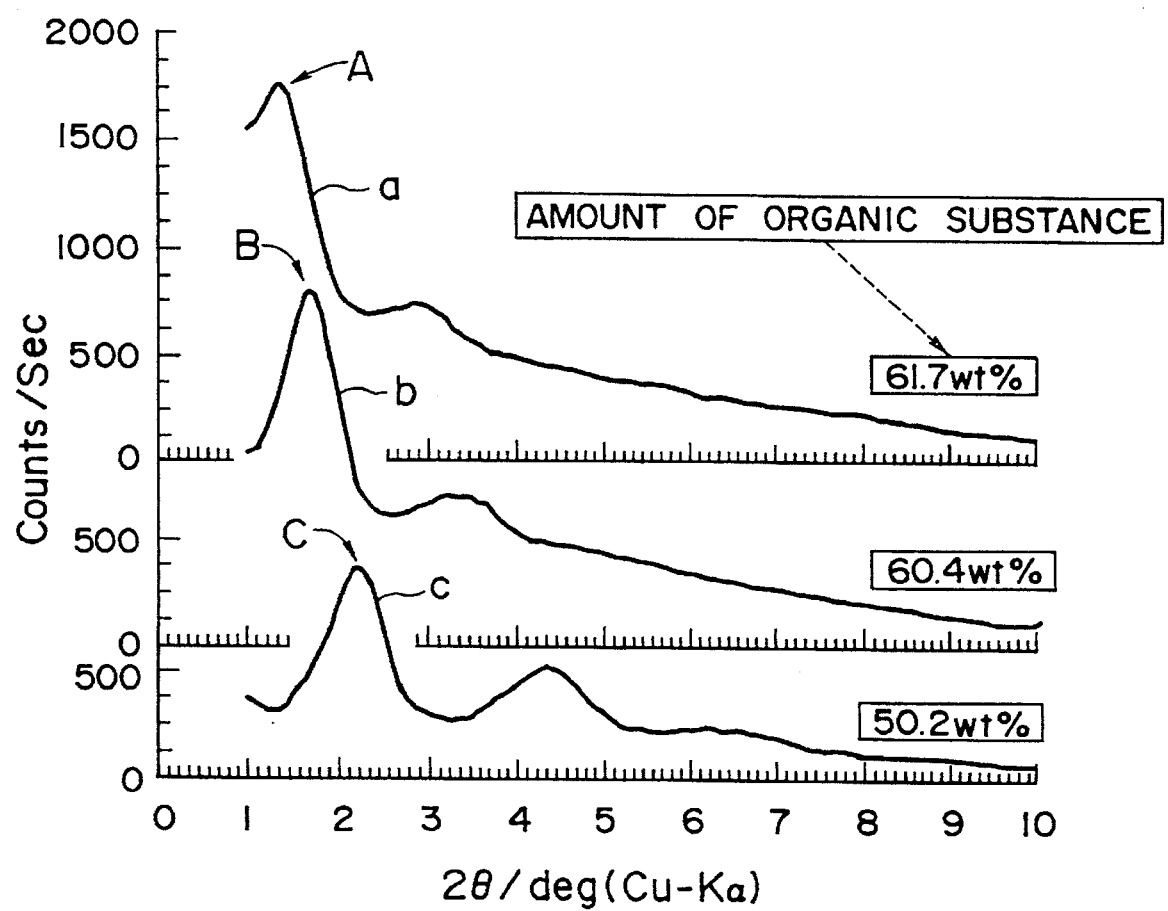
FIG. 7 is a diagram showing X-ray diffraction patterns of hybrid materials according to an embodiment of the present invention.
Figure 8:
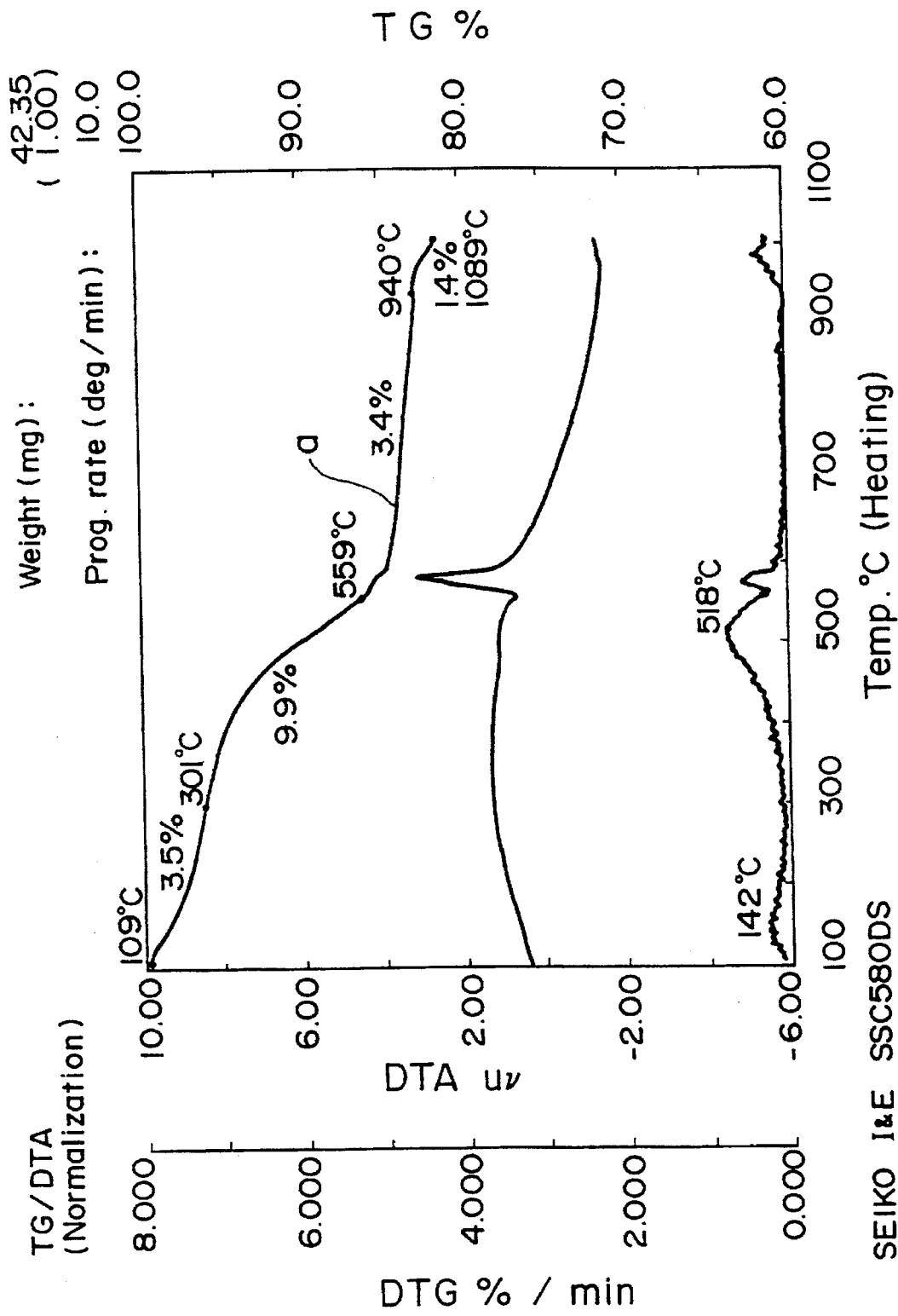
FIG. 8 is a diagram showing thermogravimetric (TG) curves of a hybrid material according to an embodiment of the present invention.
Figure 9:
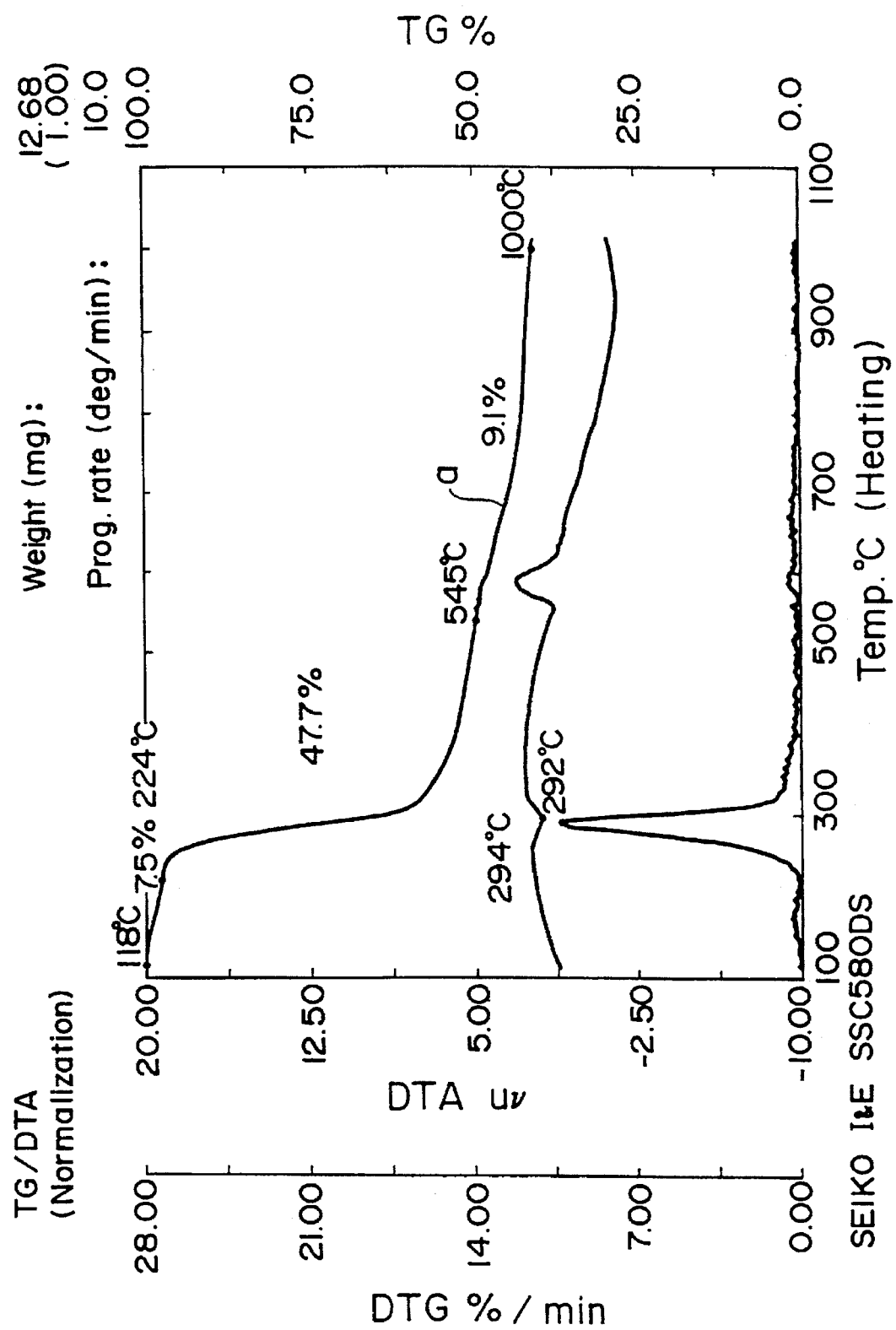
FIG. 9 is a diagram showing thermogravimetric (TG) curves of a hybrid material according to another embodiment of the present invention.
Figure 10:
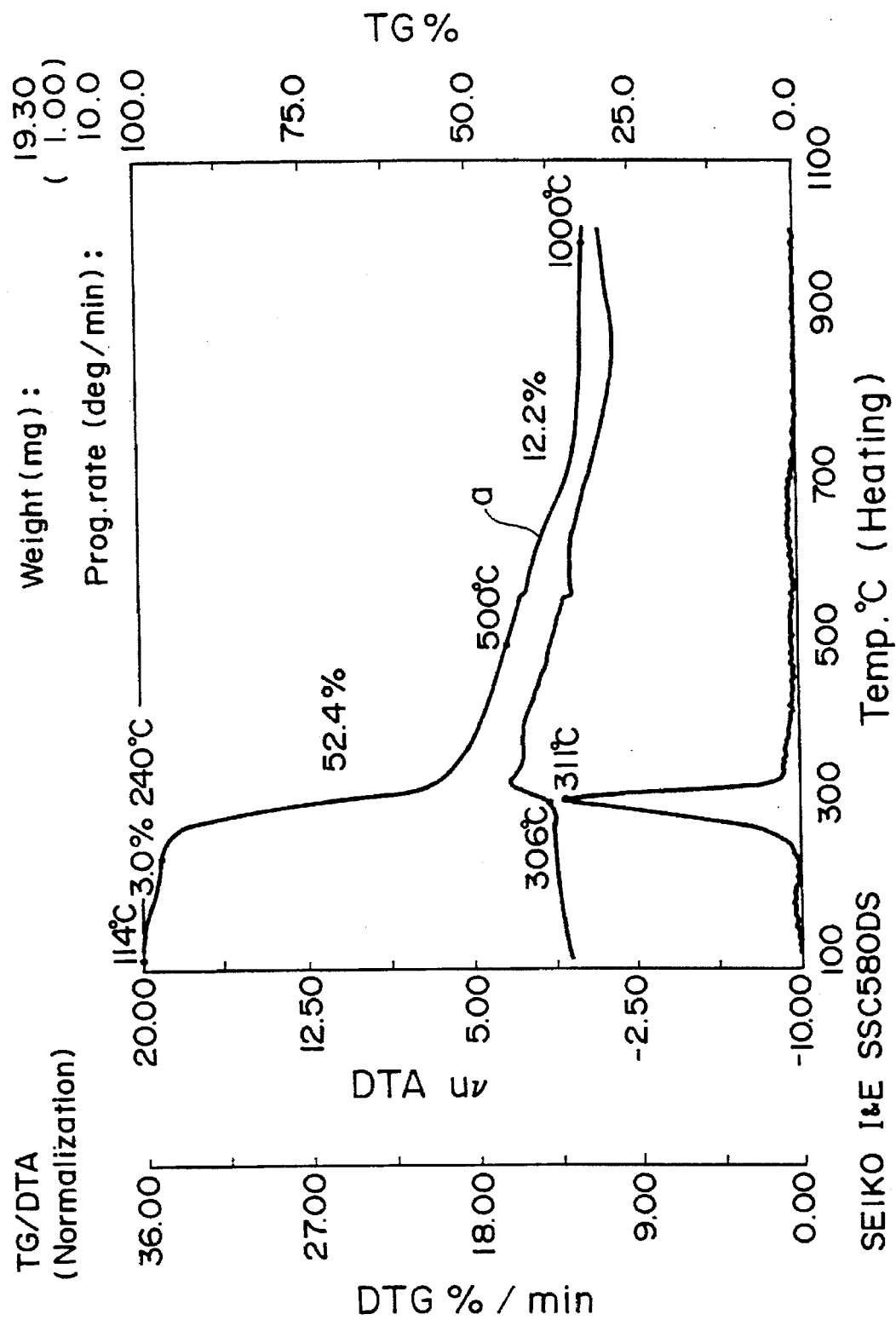
FIG. 10 is a diagram showing thermogravimetric (TG) curves of a hybrid material according to a still other embodiment of the present invention.
Figure 11:
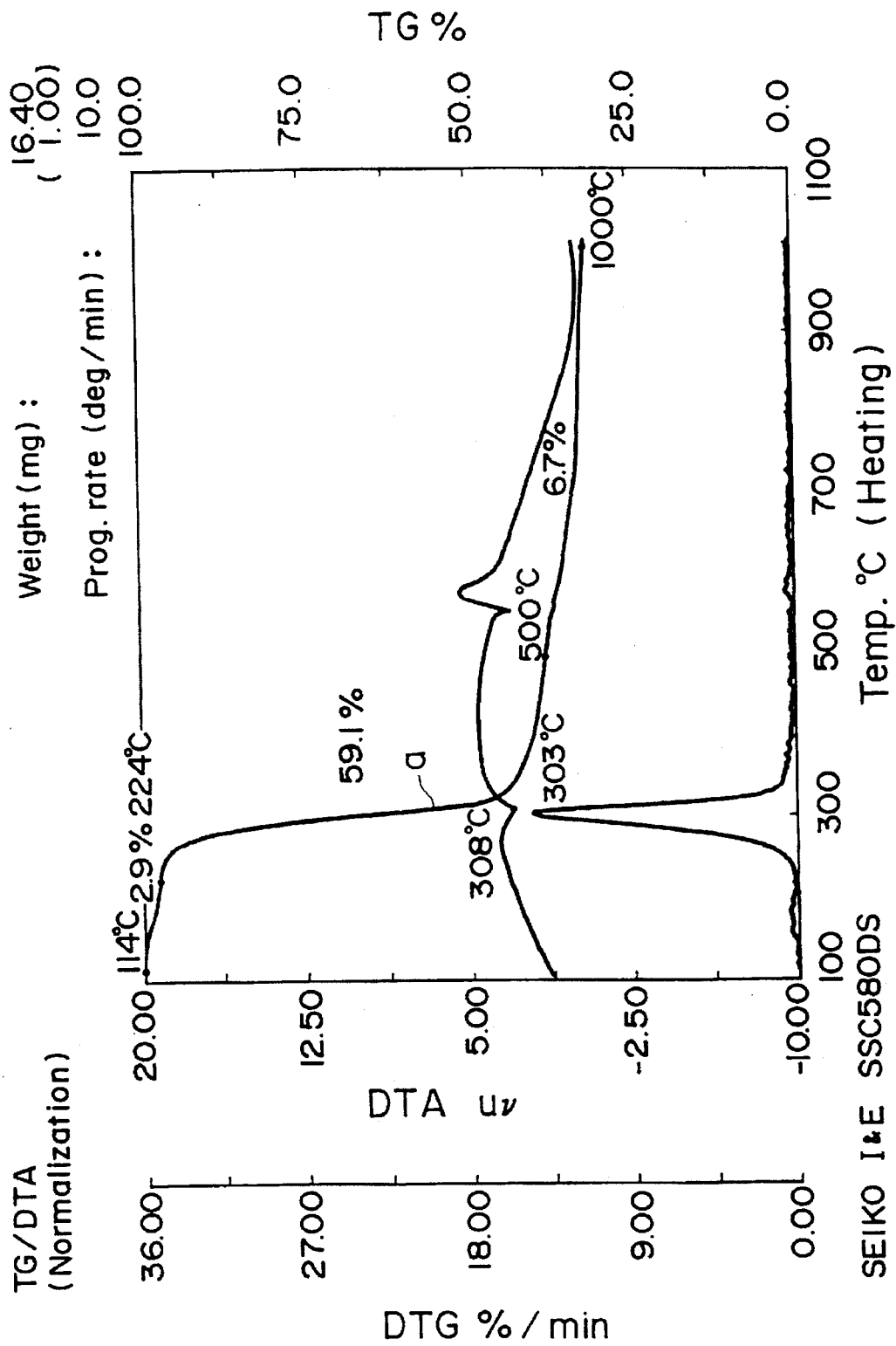
FIG. 11 is a diagram showing thermogravimetric (TG) curves of a hybrid material according to a yet other embodiment of the present invention.
Figure 12:
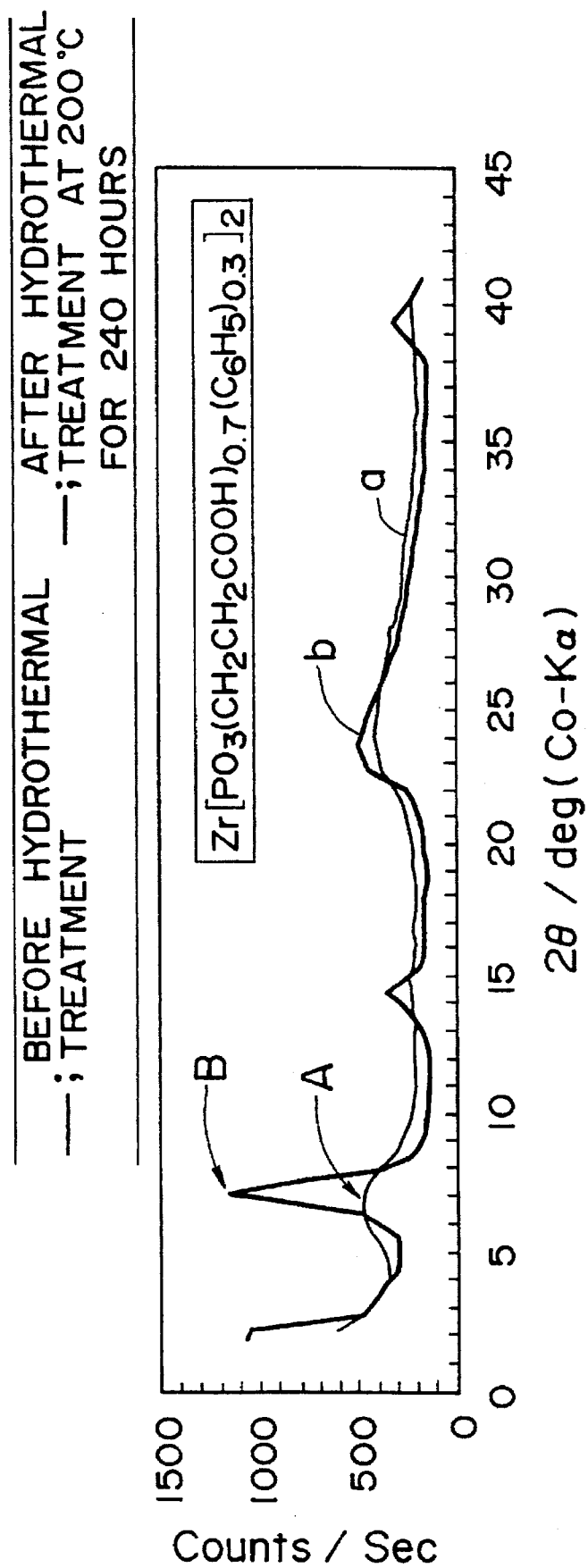
FIG. 12 is a diagram showing X-ray diffraction patterns of a hybrid material according to an embodiment of the present invention.
Figure 13:
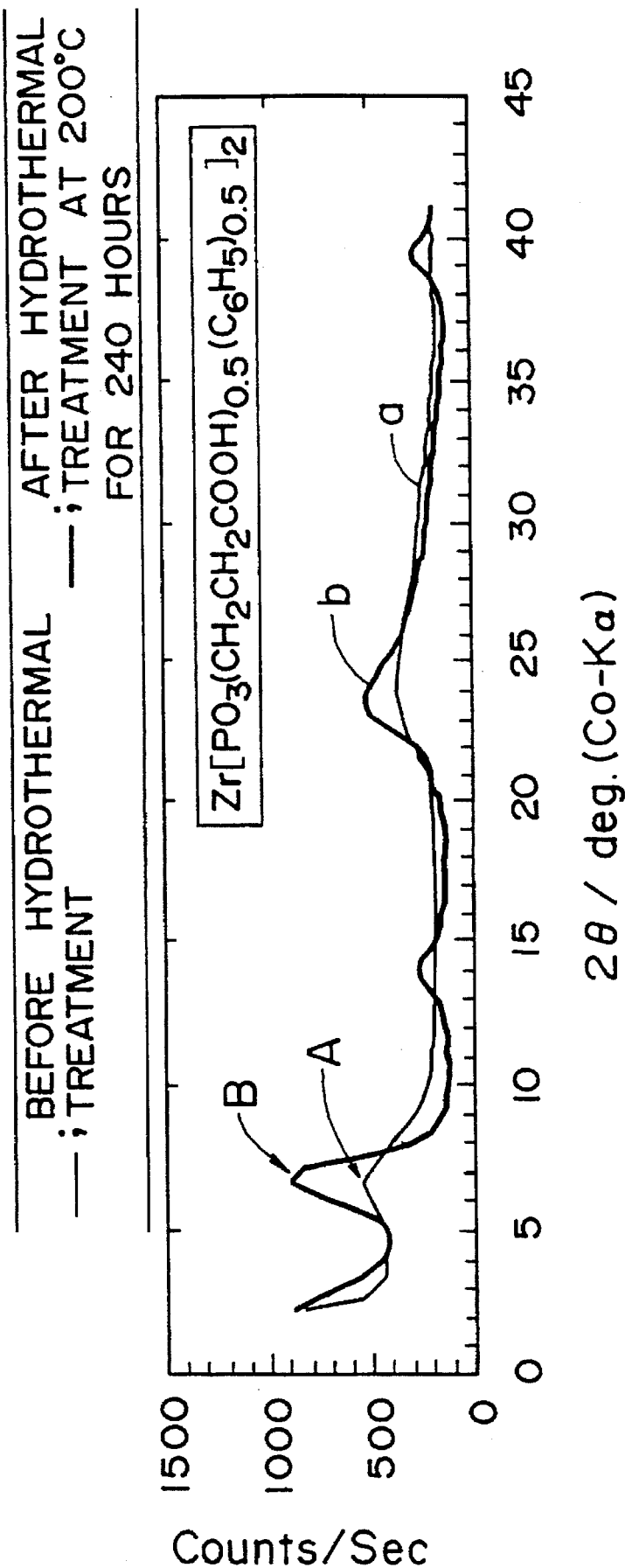
FIG. 13 is a diagram showing X-ray diffraction patterns of a hybrid material according to another embodiment of the present invention.
Figure 14:
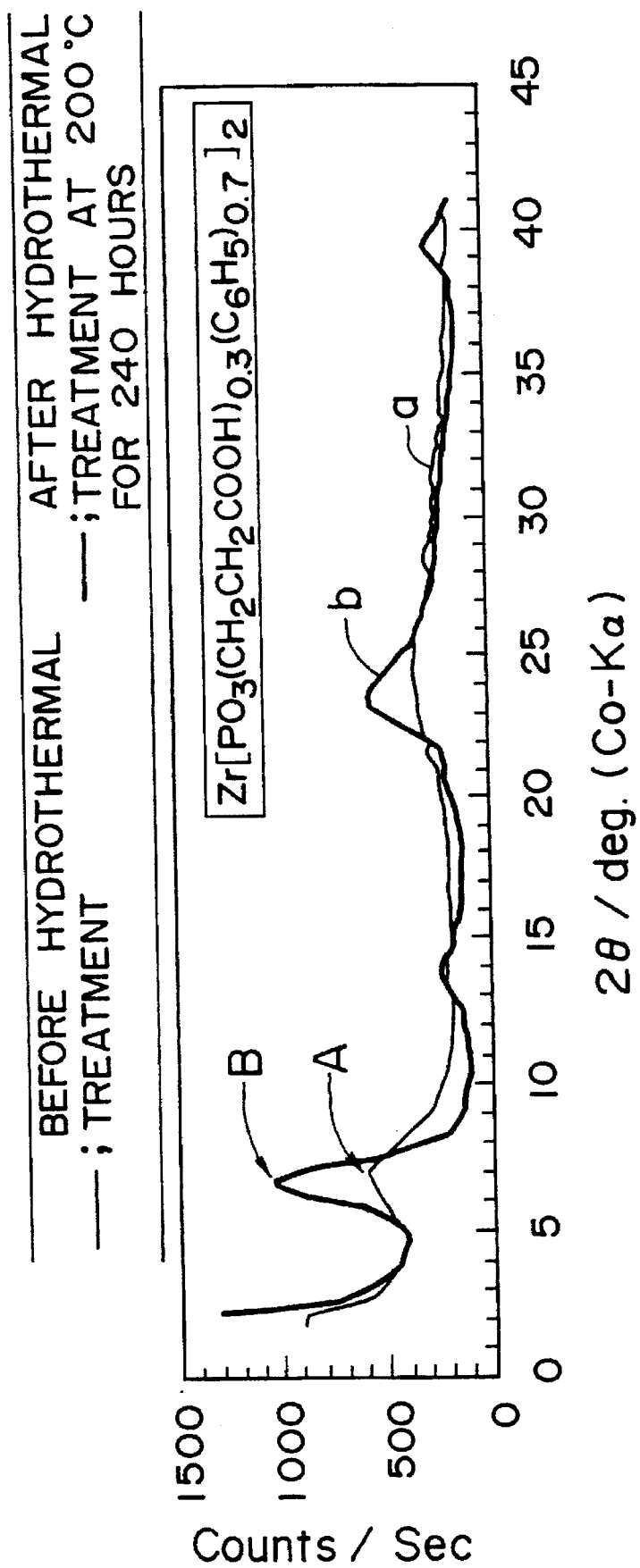
FIG. 14 is a diagram showing X-ray diffraction patterns of a hybrid material according to a still other embodiment of the present invention.
Figure 15:
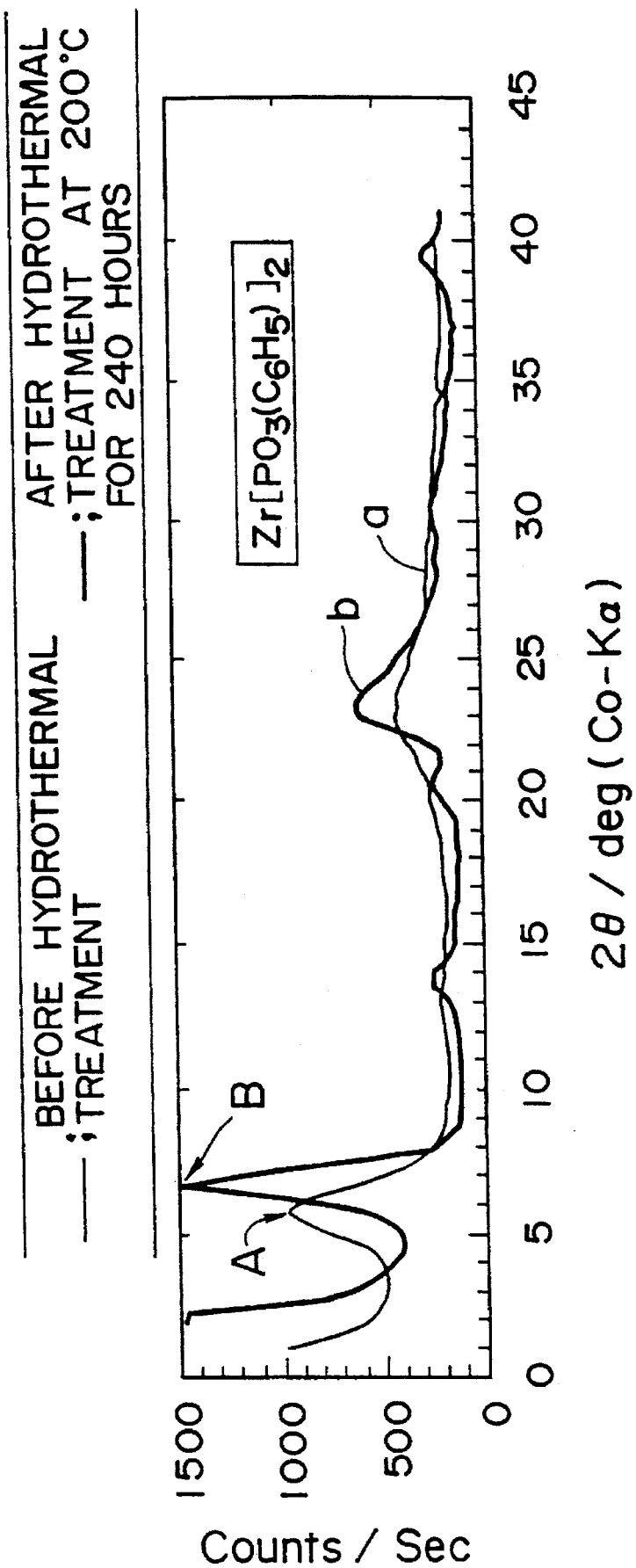
FIG. 15 is a diagram showing X-ray diffraction patterns of a hybrid material according to a yet other embodiment of the present invention.

| FIG. 7 | Curves in TG results | Quantity of 6-nylon (% by weight) | Basal spacing (nm) |
|---|---|---|---|
| c | FIG. 9 | 50 | 3.9 |
| b | FIG. 10 | 60 | 5.0 |
| a | FIG. 11 | 62 | 6.5 |

Figure 5:
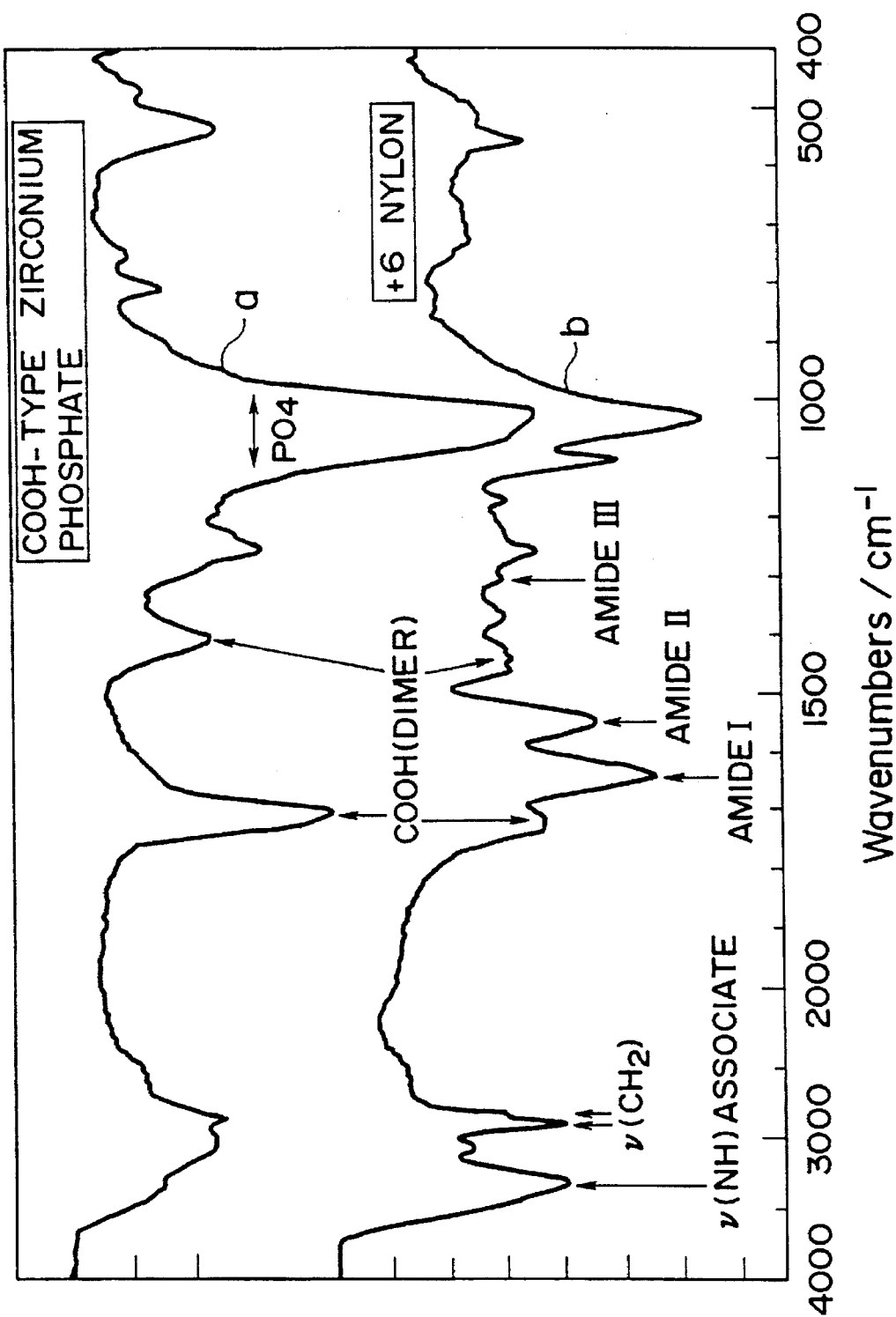
FIG. 5 is a diagram showing infrared (IR) absorption spectra for hybrid materials according to an embodiment of the present invention.
Figure 6:
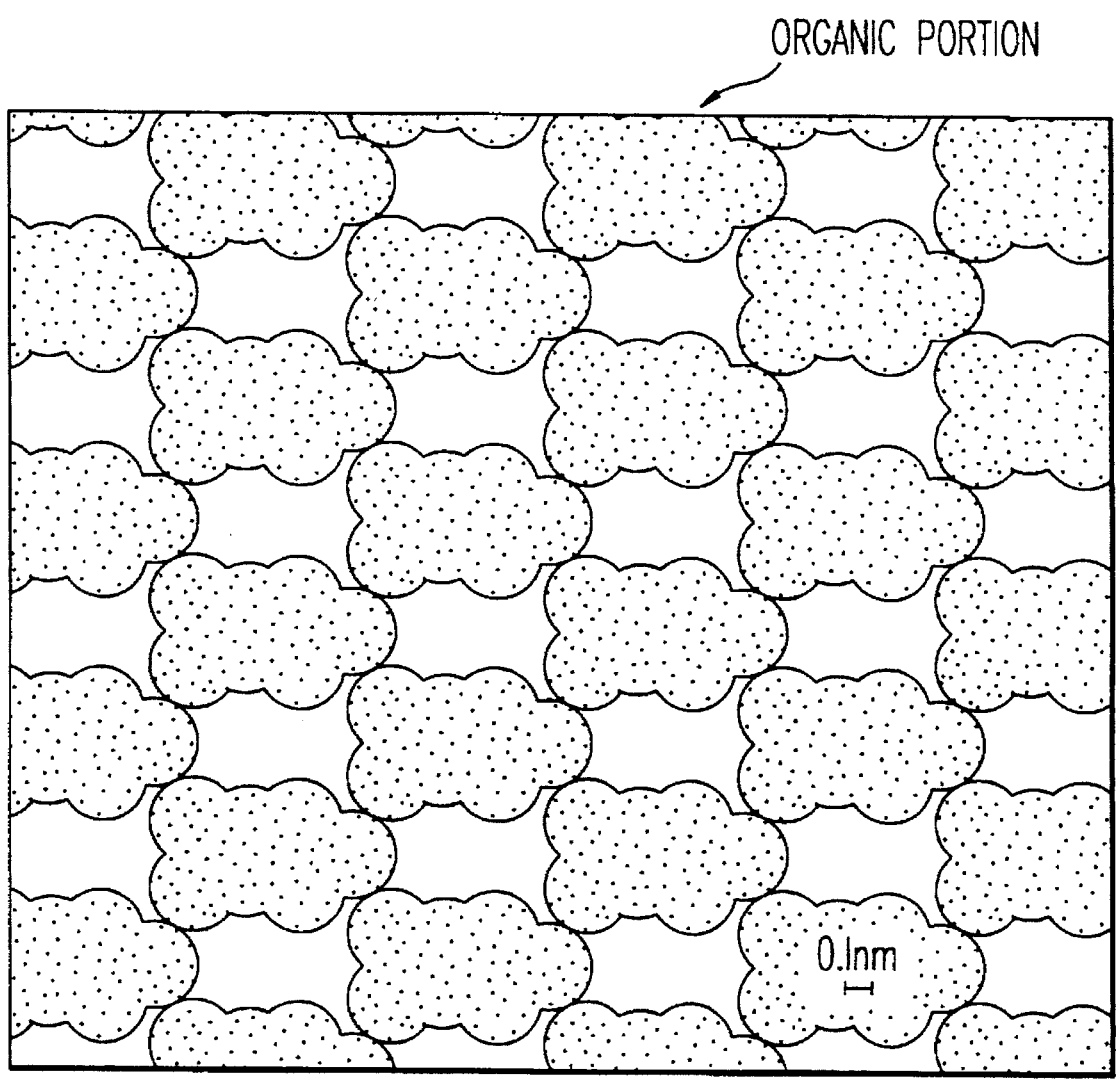
FIG. 6 is a schematically drawn diagram showing the alignment of 2-carboxylic acid on a layer surface of a composite according to an embodiment of the present invention.

Based on the results obtained by IR analysis, an amido bond was found to generate on the resulting product (see FIG. 5, curve b). The absorption bands marked with amido I, amido II, and amido III in the IR spectrum of FIG. 5 are assigned to polyamide. These absorption bands indicate that the hybrid material thus obtained contains an intercalated 6-nylon, and that the 6-nylon molecular chains are bonded approximately perpendicular to the inorganic layers.

EXAMPLE 2

Zirconium phosphate containing 2-carboxylate groups bonded thereto was synthesized in the same manner as in Example 1, and a 10 g portion thereof was mixed with 100 ml of ion-exchanged water. The resulting mixture was charged into a 200-ml volume Teflon autoclave, and was subjected to crystallization by effecting hydrothermal treatment at 200° C. for a duration of 10 days. The crystallized product was then taken out of the autoclave, and was dried at 80° C. for 10 hours after filtration. The powder thus obtained as a product was identified by X-ray diffraction. The result is given as diffractogram marked with b in FIG. 4. The X-ray diffraction pattern yields a peak B, and is similar to that of a substance having a zirconium phosphate structure. Thus, the product is identified as a crystallized compound having a zirconium phosphate structure with a basal spacing of 1.3 nm.

A 1.2-g portion of the thus obtained powder product was mixed with 22 g of ε-caprolactam and 1.8 g of aminohexanoic acid, and the resulting mixture was subjected to polymerization in the see manner as that described in Example 1 to synthesize a hybrid material. After removing the low molecular substance from the hybrid material in a manner similar to that described in Example 1, the hybrid material was dried, and was subjected to tensile tests following JIS K7113 standard. The results are given in Table 2.

TABLE 2

| | Tensile strength (MPa) | Tensile elastic modulus (GPa) |
|---|---|---|
| Example 2 | 110 | 2.3 |
| Comparative Example 1 | 85 | 1.5 |
| Comparative Example 2 | 98 | 1.9 |
| Comparative Example 3 | 70 | 1.1 |

COMPARATIVE EXAMPLE 1

A 2-g portion of α-zirconiumphosphate was suspended in 1 liter of water, and after adding 2.16 g of 12-aminododecanoic acid therein, stirring of the resulting mixture was effected at 55° C. for 2 hours. The product thus obtained was filtrated, rinsed, and dried in vacuum at 50° C. for a duration of 16 hours. An organic derivative of zirconium phosphate was obtained from the resulting product according to the ion-exchange process disclosed in JP-A-Hei5-306370. The organic derivative of zirconium phosphate thus obtained was then subjected to polymerization and molding in the same manner as in Example 1 to perform the tensile test as described in Example 2. The results are given in Table 2 above.

COMPARATIVE EXAMPLE 2

A 10-g portion of montmorillonite from Yamagata prefecture was immersed into 150 ml of 1M aqueous aminocaproic acid solution whose pH was controlled to 5.2 by using hydrochloric acid, and ion-exchange treatment was effected at room temperature for a duration of 2 hours. After the resulting product was rinsed, filtrated, and dried, a hybrid material with 6-nylon was obtained in the same manner as described in Example 1. The hybrid material thus obtained was then subjected to tensile test in a manner similar to that described in Example 2. The results are given in Table 2 above.

COMPARATIVE EXAMPLE 3

After mixing 22.5 g of ε-caprolactam with 2.5 g of 6-aminohexanoic acid in mortar, the resulting mixture was sealed in a glass tube to effect the polymerization reaction in the same manner as in Example 1 to obtain a polyamide resin. Tensile test was performed on the resulting resin in the same manner as that described in Example 2. The results are given in Table 2.

Table 2 clearly reads that the hybrid material obtained in Example 2 yields higher tensile strength and elastic modulus as compared with those obtained on the products obtained in Comparative Examples 1 to 3.

EXAMPLE 3

2-Carboxylphosphoric acid and phenylphosphonic acid were mixed at a ratio by molar [(2-carboxylphosphoric acid)/(2-carboxylphosphoric acid+phenylphosphonic acid)] of 1, 0.7, 0.5, 0.3, or 0, and a 0.8M aqueous solution was each prepared by using the resulting mixtures. Each of the resulting aqueous solutions was reacted with zirconium oxychloride in the same manner as described in Example 1 to obtain each a solid precipitate. The solid precipitates thus obtained were each rinsed, filtrated, and dried. Each of the products thus obtained was studied by X-ray diffraction to give the diffractograms marked with a as shown in FIG. 4 and in FIGS. 12 to 15. Thus, the curves in FIG. 4, FIG. 12, FIG. 13, FIG. 14, and FIG. 15 are for the samples each obtained at a ratio by molar [(2-carboxylphosphoric acid)/ (2-carboxylphosphoric acid+phenylphosphonic acid)] of 1, 0.7, 0.5, 0.3, and 0, respectively. In each of the figures, the curve marked with a yields a pattern similar to that of a substance having a zirconium phosphate structure, and a peak A corresponding to the basal spacing. Thus, it was confirmed therefrom that the products are each a layered substance having a zirconium phosphate structure. Then, the products were each crystallized in the same manner as that described in Example 2, and the resulting products were each identified by X-ray diffraction. The results obtained on the crystallized products are given as diffractograms marked with b as shown in FIG. 4 and in FIGS. 12 to 15. In each of the figures, the curve marked with b yields a pattern similar to that of a substance having a zirconium phosphate structure, and a peak B corresponding to the basal spacing. Thus, it was confirmed therefrom that the products are each a layered substance having a zirconium phosphate structure. The basal spacing for each of the products is given in Table 3. From the results obtained by X-ray diffraction (curves a and b in FIG. 4 and FIGS. 12 to 15), carbonyl groups and phenyl groups were found to remain at the initial mixing ratio, and to be uniformly dispersed in the final product thus obtained. More specifically, this was concluded from the change in basal spacing with changing the content ratio of the carbonyl and phenyl groups. That is, in case phenyl groups account for 50% or more, the basal spacing depends only on the phenyl groups that are larger in size than the carbonyl groups. The 2-carbonyl groups fill the interstices of the phenyl groups, and 2-carbonyl groups were found to pose no influence on the basal spacing.

Figure 16:
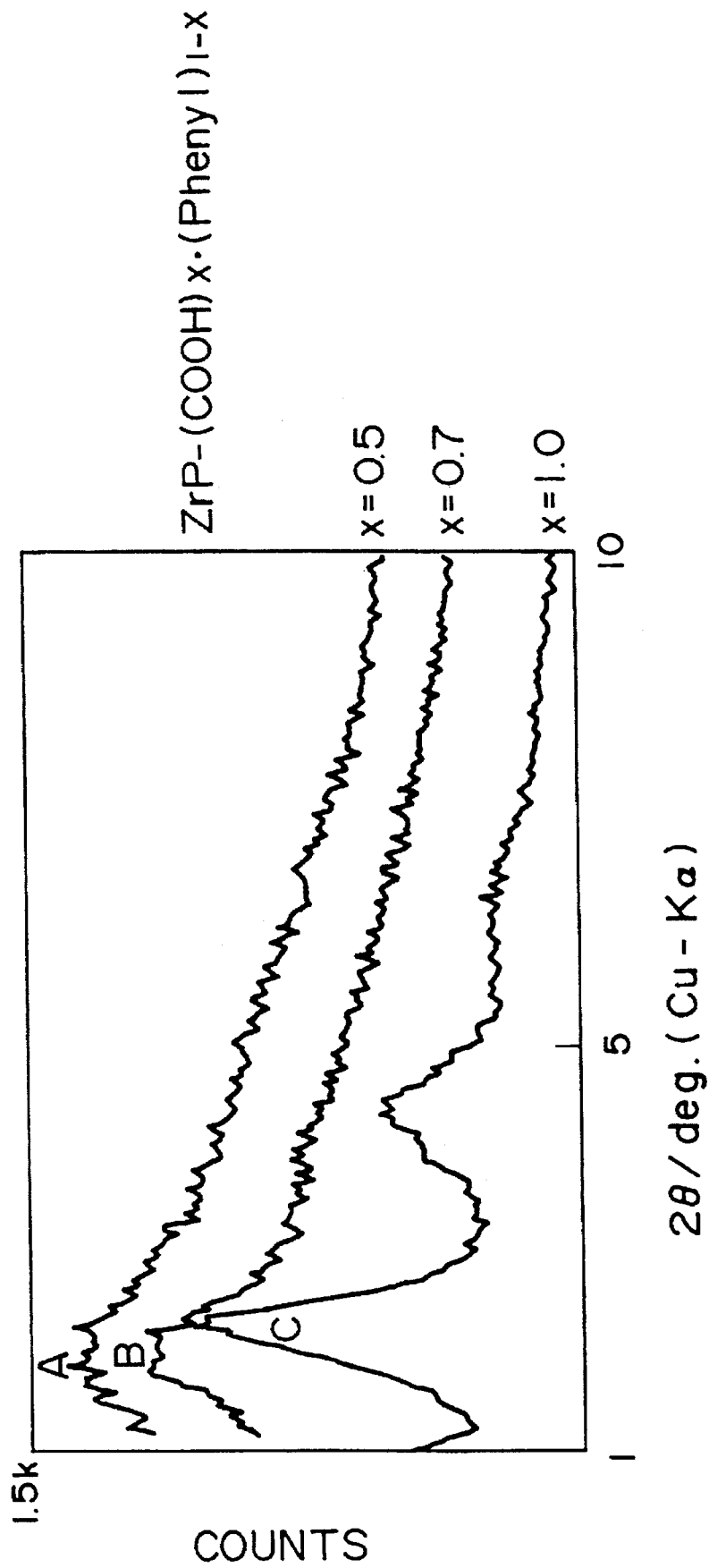
FIG. 16 is a diagram showing X-ray diffraction patterns of a hybrid material according to a further other embodiment of the present invention.

Among the zirconiumphosphate obtained above, those having a ratio by molar [(2-carboxylphosphoric acid)/(2-carboxylphosphoric acid+phenylphosphonic acid)] of 1.0, 0.7, or 0.5 was mixed (2.0 g) with 2.0 g of ε-caprolactam, followed by polymerization and rinsing. The products thus obtained were each studied by X-ray diffraction. The results are given in FIG. 16. The ratio by molar [(2-carboxylphosphoric acid)/(2-carboxylphosphoric acid+phenylphosphonic acid)] is shown by X and is given in the figure. The basal spacing for each of the products was determined from the peak A, B, or C. The results are given in Table 3.

TABLE 3

| Molar ratio* | Basal Spacing (nm) | |
|---|---|---|
| | Before adding 6-nylon | After adding 6-nylon |
| 1.0 | 1.29 | 3.9 |
| 0.7 | 1.46 | 4.4 |
| 0.5 | 1.55 | 4.4 |
| 0.3 | 1.55 | — |
| 0 | 1.55 | — |

*Ratio by molar: [(2-carboxylphosphoric acid)/(2-carboxyl-phosphoric acid + phenylphosphonic acid)]

It can be seen from the foregoing that the basal spacing slightly increases with increasing content of phenyl groups, however, the X-ray diffraction peak assigned to the basal reflection becomes considerably broad. The presence of a phenyl group induces disordering in the layer stacking, and impairs the regular structure of the intercalated polymers.

EXAMPLE 4

Figure 17:
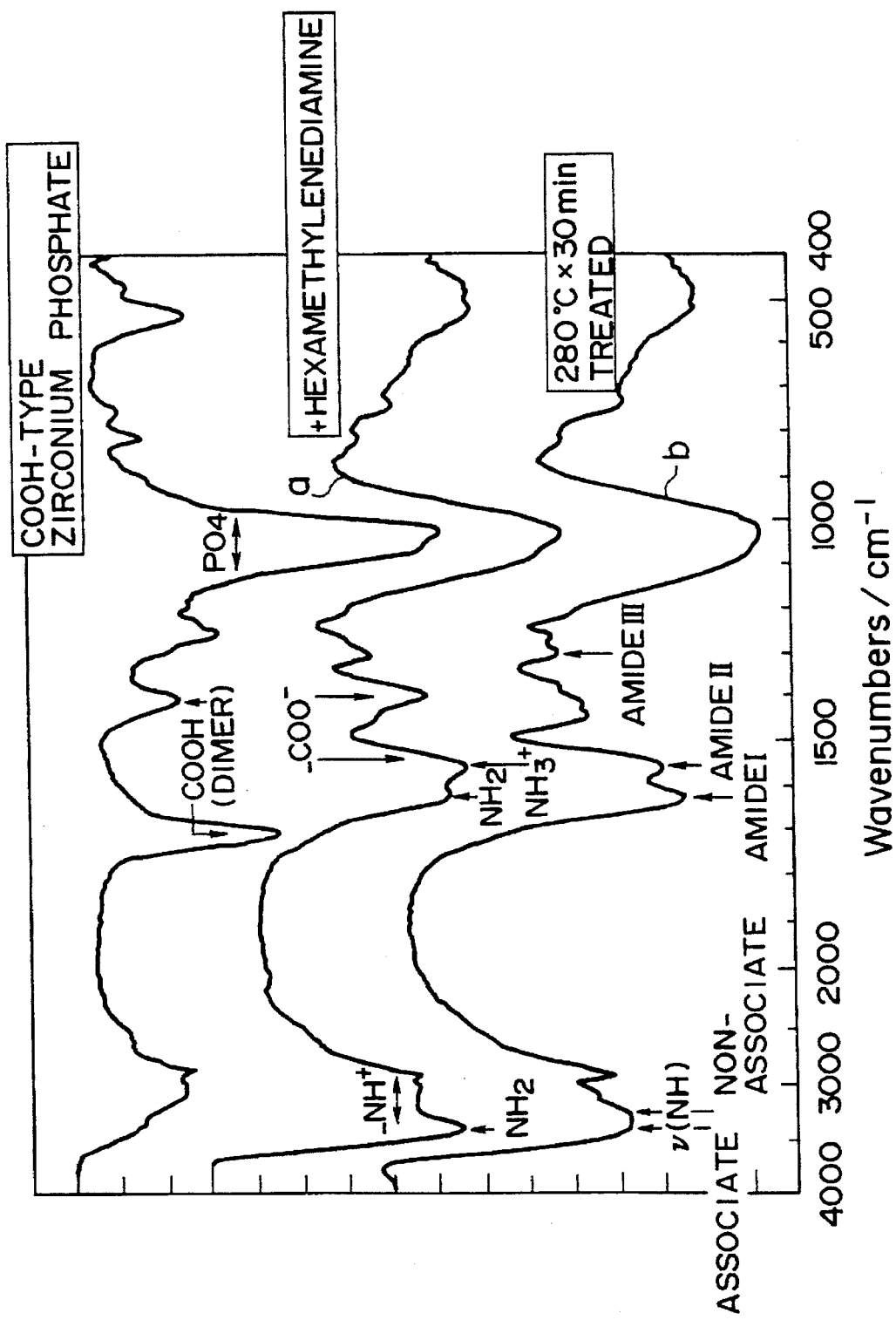
FIG. 17 is a diagram showing infrared (IR) absorption spectra for hybrid materials according to an embodiment of the present invention.

A 1,000-ml portion of 0.02M aqueous titanium tetrachloride solution was mixed with 50 ml of 0.8M aqueous solution of aminopropylsulfonic acid to obtain a precipitate. The resulting precipitate was subjected to filtration, rinsing, and drying in the same manner as described in Example 1, which was followed by crystallization by means of hydrothermal reaction and drying. Ten grams of the resulting titanium phosphate having an aminopropyl group bonded thereto was suspended in 500 ml of water. After adding 80 ml of 1M aqueous adipic acid solution into the suspension, 40 ml of 1M aqueous hexamethylenediamine solution was further added therein. The resulting mixed solution was heated at 40° C. for a duration of 1 hour. After filtration and adding 100 ml of water, the resulting product was placed in a 200-ml volume Teflon vessel and was sealed airtight therein. The treatment was performed at 120° C. for a duration of 10 hours. The resulting product was filtered, and was dried in vacuum at 40° C. for a duration of 48 hours. The product thus obtained was subjected to IR analysis. The result is given as a spectrum marked with a in FIG. 17. The generation of —COO⁻ and NH₃⁺ radicals were confirmed on the IR spectrum thus obtained. Thus, the formation of an intercalated nylon salt was confirmed. The resulting product was charged into a reaction tube equipped with an inlet for gaseous nitrogen, and was treated at 280° C. for a duration of 30 minutes. Amino bond was confirmed to generate on the product thus obtained (see FIG. 17, IR absorption spectrum b). Thus, a hybrid material of titanium phosphate containing 6,6-nylon with amino group bonded thereto was obtained.

EXAMPLE 5

An aqueous solution was prepared by dissolving 62 g of 2-carboxylphosphoric acid [(COOH)(CH₂)₂PO(OH)₂] in 500 ml of ion-exchanged water. Another aqueous solution prepared by dissolving 65 g of zirconium oxychloride octahydrate (ZrCl₂.O.8H₂O) in 10 l of water was added dropwise over about 30 minutes into the aqueous solution above while stirring. A solid matter was found to generate, but was dispersed in the aqueous solution. The suspension thus obtained was subjected to repeated filtration using a filter press and rinsing with 10 l of water until the pH of the filtrate became 6.5. One litter of water was added to the wet cake thus obtained, and the resulting product was charged into a steel autoclave to perform hydrothermal treatment for a duration of 3 days. The product was freeze-dried thereafter to obtain a 2-carboxyl derivative of zirconium phosphate in the form of a powder.

A 100-g portion of the powder thus obtained was mixed with each of 120-, 160-, and 400-g portion of ε-caprolactam, and the resulting mixtures were each heated at 100° C. for a duration of 30 minutes. After purging a glass vessel with argon, the resulting mixtures were each sealed airtight therein to perform heat treatment at 250° C. for a duration of 6 hours. The products thus obtained were each coarsely ground in an alumina mortar, and were each immersed in 5 l of water at 80° C. for a duration of 1 hour. The products were each subjected to filtration, and the filtrate was dried in vacuum at 80° C. for a duration of 24 hours.

The hybrid materials thus obtained were each molded in the same manner as in Examples 1 and 2, and were subjected to X-ray diffraction and to the evaluation of mechanical properties. The results are given in Table 4.

TABLE 4

| | Sample No. | | |
|---|---|---|---|
| | 1 | 2 | 3 |
| Addition of ε-caprolactam to 100 g of Zr phosphate derivative (g) | 120 | 160 | 400 |
| Elastic modulus (at 23° C.) (GPa) | 3 | 2.5 | 2 |
| Tensile strength (at 23° C.) (MPa) | 5 | 95 | 100 |
| Charpy impact strength (kJ/m²) | 0.5 | 9 | 10 |
| Thermal Deformation Temperature (under a stress of 1.82 MPa) | — | 230 | 200 |
| Basal spacing (nm) | 4.1 | 5.0 | >10 |
| Average number of intercalated carbon atoms calculated from basal spacing | 19 | 31 | >60 |

The thermal deformation temperature for sample No. 1 was not available because it underwent melting during the measurement. However, the elastic modulus for sample No. 1 was good.

Table 4 reads that a hybrid material having a basal spacing of 5.0 nm or longer exhibit excellent tensile strength and thermal deformation properties.

While the invention has been described in detail and with reference to specific embodiments thereof, it will be apparent to one skilled in the art that various changes and modifications can be made therein without departing from the spirit and scope thereof.

What is claimed is:

1. A hybrid material comprising:
   a layer containing an octahedral sheet comprising octahedra linked with each other to provide a sheet structure and a tetrahedral sheet comprising tetrahedra linked with each other to provide a sheet structure, said tetrahedral sheet being linked to said octahedral sheet by plane to plane; and
   a first organic portion bonded by covalent bond to an element located at the tetrahedral site of the tetrahedra,
   each of said octahedra having an element at the octahedral site thereof with a valence in the range of from 3.5 to 4.5 on average over the entire octahedral sheet, and each of said tetrahedra having an element at the tetrahedral site thereof with a valence in the range of from 4.5 to 5.5 on average over the entire tetrahedral sheet.

2. A hybrid material as claimed in claim 1, wherein the layer is a zirconium phosphate layer expressed by $Me[XO_3.R]_2$, where Me represents at least one element selected from the group consisting of titanium, zirconium, germanium, tin, lead, and cerium; X represents at least one selected from the group consisting of phosphorus and arsenic; and R represents said first organic portion, said X being bonded by covalent bond to said R.

3. A hybrid material as claimed in claim 1, wherein said first organic portion is a polyamido- or polypropylene- group.

4. A hybrid material as claimed in claim 1, wherein said first organic portion has a functional group and a second organic portion bonded to said first organic portion through said functional group.

5. A hybrid material as claimed in claim 1, wherein the layer has a basal spacing of 4.4 nm or more on average from adjacent layers.

6. A hybrid material as claimed in claim 5, wherein the layer has a basal spacing of 5.0 nm to 100 nm on average from adjacent layers.

7. A process for producing a hybrid material comprising the step of:
   reacting a substance containing: an element which functions as an element at the octahedral site of octahedra constituting an octahedral sheet; and other elements constituting the octahedral sheet except for the element at the octahedral site, with a substance containing: an element at the tetrahedral site of tetrahedra constituting a tetrahedral sheet; a first organic portion that is combined by covalent bond with the element at the tetrahedral site; and other elements constituting the tetrahedral sheet except for the element at the tetrahedral site, in such a manner that the resulting octahedral sheet has elements at the octahedral sites thereof with an average valence in the range of from 3.5 to 4.5 and that the resulting tetrahedral sheet has elements at the tetrahedral sites thereof with an average valence in the range of from 4.5 to 5.5,
   thereby obtaining a hybrid material having a layer containing the octahedral sheet comprising octahedra linked with each other to provide a sheet structure and the tetrahedral sheet comprising tetrahedra linked with each other to provide a sheet structure, said tetrahedral sheet being linked to said octahedral sheet by plane to plane, and a first organic portion bonded by covalent bond to the element located at the tetrahedral site of the tetrahedra.

8. A process for producing a hybrid material as claimed in claim 7, wherein the reaction step is performed by reacting a substance containing: at least one element selected from the group consisting of titanium, zirconium, germanium, tin, lead, and cerium; and oxygen, with a substance containing: at least one element selected from the group consisting of phosphorus and arsenic; the first organic portion bonded thereto; and oxygen, to obtain a zirconium phosphate layer expressed by $Me[XO_3.R]_2$ for said layer, where Me represents at least one element selected from the group consisting of titanium, zirconium, germanium, tin, lead, and cerium; X represents at least one selected from the group consisting of phosphorus and arsenic; and R represents the first organic portion, said X being bonded by covalent bond to said R.

9. A process for producing a hybrid material as claimed in claim 7, further comprising the step of:
   controlling the content of an organic component and an inorganic component in a hybrid material, by adding a substance containing the element for the tetrahedral site but to which no organic portion is bonded to the substance containing the element for the tetrahedral site at a predetermined quantity ratio and the organic portion bonded thereto by covalent bond.

10. A process for producing a hybrid material as claimed in claim 8, further comprising the step of:
    controlling the content of an organic component and an inorganic component in the hybrid material by adding a substance containing the X which is not bonded with the R to a substance containing the X and the R bonded to the X at a predetermined quantity ratio.

11. A process for producing a hybrid material as claimed in claim 7, wherein the first organic portion has a functional group, further comprising the step of:
    controlling the content of an organic component and an inorganic component in the hybrid material by controlling the gross number of functional group of the first organic portion which is capable of bonding with a second organic portion; and
    bonding the second organic portion to the functional group of said first organic portion.

12. A process for producing a hybrid material as claimed in claim 8, wherein the first organic portion has a functional group, further comprising the step of:
    controlling the content of an organic component and an inorganic component in the hybrid material by controlling the gross number of the functional group of the first organic portion which is capable of bonding to a second organic portion; and
    bonding the second organic portion to the functional group of said first organic portion.

13. A surface hardening material comprising:
    a layer containing an octahedral sheet comprising octahedra linked with each other to provide a sheet structure and a tetrahedral sheet comprising tetrahedra linked with each other to provide a sheet structure, said tetrahedral sheet being linked to said octahedral sheet by plane to plane; and
    an organic portion bonded by covalent bond to an element located at the tetrahedral site of the tetrahedra;
    said octahedral sheet comprising octahedra each having an element at the octahedral site thereof with a valence in the range of from 3.5 to 4.5 on average over the entire octahedral sheet, and said tetrahedral sheet comprising tetrahedra each having an element at the tetrahedral site thereof with a valence in the range of from 4.5 to 5.5 on average over the entire tetrahedral sheet.

14. A wrapping material comprising:
    a layer containing an octahedral sheet comprising octahedra linked with each other to provide a sheet structure and a tetrahedral sheet comprising tetrahedra linked with each other to provide a sheet structure, said tetrahedral sheet being linked to said octahedral sheet by plane to plane, and an organic portion bonded by covalent bond to an element located at the tetrahedral site of the tetrahedra;

said octahedral sheet comprising octahedra each having an element at the octahedral site thereof with a valence in the range of from 3.5 to 4.5 on average over the entire octahedral sheet, and said tetrahedral sheet comprising tetrahedra each having an element at the tetrahedral site thereof with a valence in the range of from 4.5 to 5.5 on average over the entire tetrahedral sheet.

15. An ultraviolet radiation absorber comprising:

a layer containing an octahedral sheet comprising octahedra linked with each other to provide a sheet structure and a tetrahedral sheet comprising tetrahedra linked with each other to provide a sheet structure, said tetrahedral sheet being linked to said octahedral sheet by plane to plane; and an organic portion bonded by covalent bond to an element located at the tetrahedral site of the tetrahedra;

said octahedral sheet comprising octahedra each having titanium or cerium at the octahedral site thereof, and said tetrahedral sheet comprising tetrahedra each having an element at the tetrahedral site thereof with a valence in the range of from 4.5 to 5.5 on average over the entire tetrahedral sheet.

16. An electron donor comprising:

a layer containing an octahedral sheet comprising octahedra linked with each other to provide a sheet structure and a tetrahedral sheet comprising tetrahedra linked with each other to provide a sheet structure, said tetrahedral sheet being linked to said octahedral sheet by plane to plane; and an aromatic organic group bonded by covalent bond to the element located at the tetrahedral site of the tetrahedra;

said octahedral sheet comprising octahedra each having an element at the octahedral site thereof with a valence in the range of from 3.5 to 4.5 on average over the entire octahedral sheet, said tetrahedral sheet comprising tetrahedra each having an element at the tetrahedral site thereof with a valence in the range of from 4.5 to 5.5 on average over the entire tetrahedral sheet, and said layer being doped with transition metal ions.

17. An electron donor as claimed in claim 16, wherein the electron donor is an anion polymerization initiator.

* * * * *